US012811213B2

(12) United States Patent
Oshida

(10) Patent No.: US 12,811,213 B2
(45) Date of Patent: Nov. 24, 2026

(54) BATTERY PACK, ELECTRIC TOOL, AND ELECTRIC VEHICLE

(71) Applicant: MURATA MANUFACTURING CO., LTD., Kyoto (JP)

(72) Inventor: Takumi Oshida, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 449 days.

(21) Appl. No.: 18/442,881

(22) Filed: Feb. 15, 2024

(65) Prior Publication Data

US 2024/0213568 A1 Jun. 27, 2024

Related U.S. Application Data

(63) Continuation of application No. PCT/JP2022/027463, filed on Jul. 12, 2022.

(30) Foreign Application Priority Data

Sep. 30, 2021 (JP) ................................ 2021-161512

(51) Int. Cl.
*H01M 10/653* (2014.01)
*H01M 10/613* (2014.01)
(Continued)

(52) U.S. Cl.
CPC ..... *H01M 10/653* (2015.04); *H01M 10/6235* (2015.04); *H01M 10/625* (2015.04);
(Continued)

(58) Field of Classification Search
CPC .................................................. H01M 10/653
See application file for complete search history.

(56) References Cited

U.S. PATENT DOCUMENTS

2016/0006007 A1 1/2016 Takasaki et al.
2016/0218050 A1 7/2016 Yoshihara et al.
(Continued)

FOREIGN PATENT DOCUMENTS

DE 102022112481 A1 * 3/2023 .......... H01M 50/289
JP H11273643 A 10/1999
(Continued)

OTHER PUBLICATIONS

International Search Report of corresponding PCT application PCT/JP2022/027463, dated Oct. 4, 2022.

*Primary Examiner* — Stephan J Essex
(74) *Attorney, Agent, or Firm* — K&L Gates LLP

(57) ABSTRACT

Provided is a battery pack with improved heat dissipation characteristics and the like. A battery pack includes a spacer member, the spacer member is composed of a first insulating member and a second insulating member, the first insulating member and the second insulating member are in contact with a predetermined inner surface of an exterior case, the first insulating member is disposed to surround the second insulating member, and the first insulating member and the second insulating member satisfy the following relationships (1) to (3).

Specific gravity: first insulating member < second insulating member (1)

Young's modulus: first insulating member > second insulating member (2)

Thermal conductivity: first insulating member < second insulating member (3)

13 Claims, 17 Drawing Sheets

(51) Int. Cl.

| | |
|---|---|
| ***H01M 10/6235*** | (2014.01) |
| ***H01M 10/625*** | (2014.01) |
| ***H01M 10/643*** | (2014.01) |
| ***H01M 10/651*** | (2014.01) |

(52) U.S. Cl.

CPC ........ *H01M 10/651* (2015.04); *H01M 10/613* (2015.04); *H01M 10/643* (2015.04); *H01M 2220/20* (2013.01); *H01M 2220/30* (2013.01)

(56) References Cited

U.S. PATENT DOCUMENTS

| | | | |
|---|---|---|---|
| 2017/0352931 | A1 | 12/2017 | Yoshida et al. |
| 2019/0221904 | A1 | 7/2019 | Fujii |
| 2020/0003840 | A1 | 1/2020 | Rodriguez et al. |

FOREIGN PATENT DOCUMENTS

| | | | |
|---|---|---|---|
| JP | 2015076442 | A | 4/2015 |
| JP | 2019125449 | A | 7/2019 |
| JP | 2020004716 | A | 1/2020 |
| WO | 2014/132649 | A1 | 9/2014 |
| WO | 2016/113798 | A1 | 7/2016 |

* cited by examiner

A

B

A

B

A

B

BATTERY PACK, ELECTRIC TOOL, AND ELECTRIC VEHICLE

CROSS REFERENCE TO RELATED APPLICATIONS

The present application is a continuation of PCT patent application no. PCT/JP2022/027463, filed on Jul. 12, 2022, which claims priority to Japanese patent application no. 2021-161512, filed on Sep. 30, 2021, the entire contents of which are incorporated herein by reference.

BACKGROUND

The present application relates to a battery pack, an electric tool, and an electric vehicle.

In the field of batteries that generate heat during use (for example, lithium ion secondary batteries), improving heat dissipation characteristics, which are ease of heat dissipation, is desirable. Further, considering that application of secondary batteries is expanding to fields of electric tools, electric vehicles, and the like, improving weight reduction and vibration resistance characteristics of battery packs containing secondary batteries is desirable.

For example, a battery pack is disclosed having improved heat dissipation characteristics while maintaining vibration resistance characteristics by using a buffer member in which a resin with high thermal conductivity is mixed with rubber particles. Further, a power module is disclosed in which rigidity is improved while cooling performance is secured by a cooling insulating layer in which soft and hard insulating layers are laminated in a thickness direction.

SUMMARY

The present application relates to a battery pack, an electric tool, and an electric vehicle.

A rubber member containing a thermally conductive material used in the technique described in Background section has a high specific gravity, and thus is disadvantageous from a viewpoint of weight reduction characteristics. Further, since the rubber member has a small Young's modulus, rigidity is reduced. For this reason, there is a possibility that resonance may occur particularly in a low frequency band (for example, 200 Hz or less), which is disadvantageous from a viewpoint of vibration resistance characteristics. A further technique described in Background section is disadvantageous from the viewpoint of weight reduction characteristics because a thermally conductive member with a high specific gravity is used. Further, since thicknesses of a hard insulating member and a soft insulating member are reduced, the rigidity is reduced, and there is a possibility that resonance may occur in a low frequency band, which is disadvantageous from the viewpoint of vibration resistance characteristics. As described above, a need for improvement from the viewpoint of, for example, weight reduction characteristics and vibration resistance characteristics in a low frequency band is desirable.

In an embodiment, the present application relates to providing a battery pack having improved various characteristics such as weight reduction characteristics, and an electric tool and an electric vehicle including the battery pack.

The present application, in an embodiment, is a battery pack including:

an exterior case;

a battery housed in the exterior case and having a terminal;

a conductive member connected to the terminal; and a spacer member disposed between the battery and the exterior case, in which the spacer member is composed of a first insulating member and a second insulating member, the first insulating member and the second insulating member are in contact with a predetermined inner surface of the exterior case, the first insulating member is disposed to surround the second insulating member, and the second insulating member is in contact with at least a part of the battery or at least a part of the conductive member, and the first insulating member and the second insulating member satisfy the following relationships (1) to (3).

Specific gravity: first insulating member<second insulating member (1)

Young's modulus: first insulating member>second insulating member (2)

Thermal conductivity: first insulating member<second insulating member (3)

According to an embodiment, it is possible to improve the weight reduction characteristics and the like of the battery pack. Note that, the contents of the present application are not to be construed as being limited by the effects exemplified in the present description.

DETAILED DESCRIPTION

Figure 1:
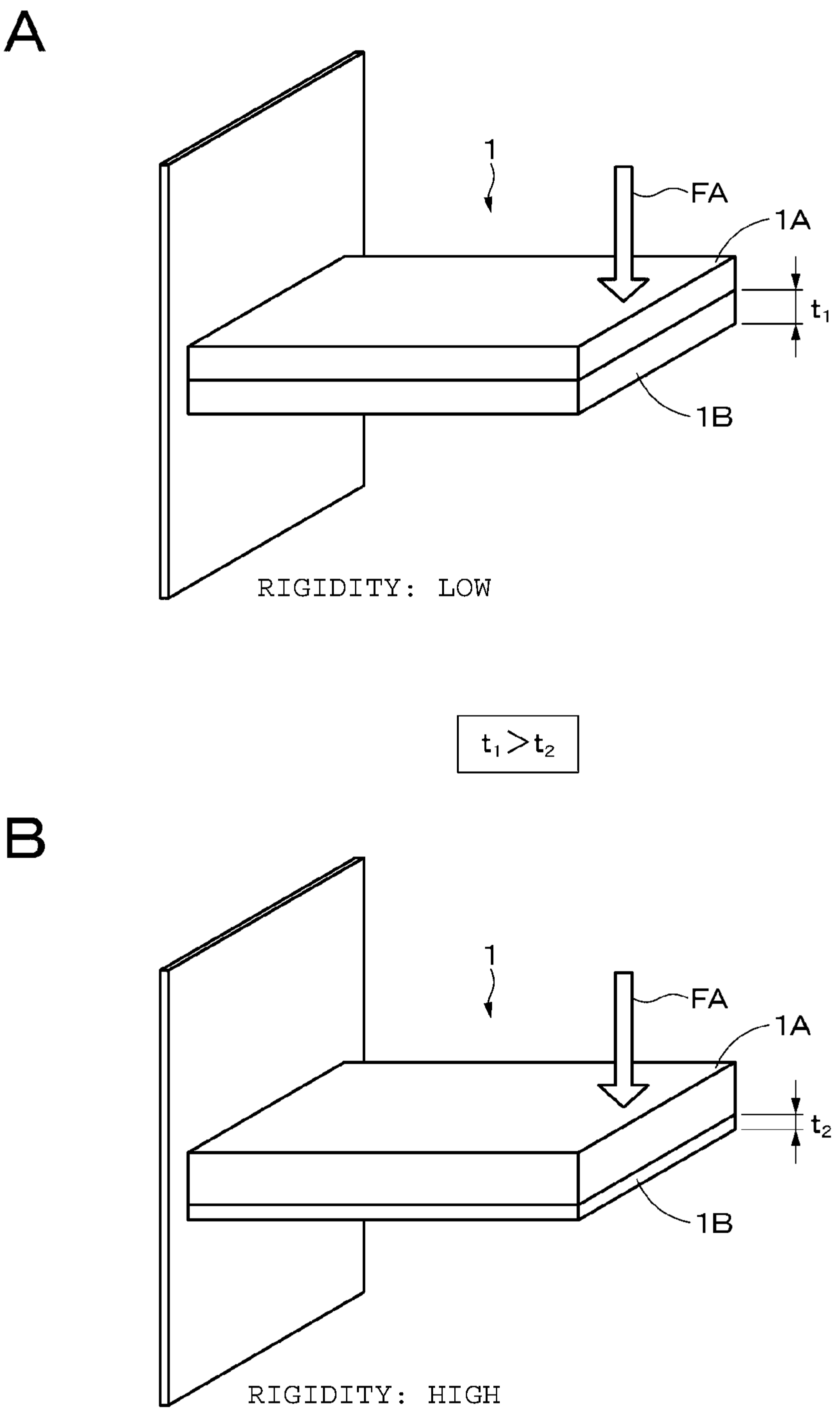
FIG. 1 includes views A and B which are diagrams relating to the present application according to an embodiment.

The present application will be described below in further detail including with reference to the drawings.

One or more embodiments are described below including preferred examples of the present technology, and the contents of the present application is not limited thereto. Note that, members shown in the claims are not specified as members of the embodiments. In particular, unless otherwise described, the present application is not intended to be limited by description regarding, for example, dimensions, materials, and shapes of constituent members described in the embodiments, relative arrangements thereof, and descriptions of directions such as upward, downward, left, and right and the like, which are merely illustrative examples. Note that, sizes, positional relationships, and the like of the members illustrated in the drawings may be exaggerated for clarity of description, and, only some of the reference numerals may be illustrated, or a part of an illustration may be simplified, in order to prevent the illustration from being complicated. Furthermore, in the following description, the same names and reference numerals indicate the same or similar members, and redundant descriptions will be appropriately omitted.

First, in order to facilitate understanding of the present application, problems to be considered in will be described while describing techniques related to the present application.

First, rigidity of a cushioning member applied to the battery pack will be described. A cushioning member of a cantilever beam in which one side (a left side when facing the drawing in the present example) is fixed and the other side (a right side when facing the drawing in the present example) is a free end is considered. FIGS. 1A and 1B illustrate a cushioning member 1 that is an example of a cushioning member. The cushioning member 1 has a configuration in which a hard member 1A and a soft member 1B are laminated in a thickness direction. The example shown in FIG. 1A is an example of the cushioning member in which a thickness $t_1$ of the soft member 1B is substantially the same as the thickness of the hard member 1A. The example shown in FIG. 1B is an example of the cushioning member in which a thickness $t_2$ of the soft member 1B is smaller than the thickness of the hard member 1A.

Figure 2:
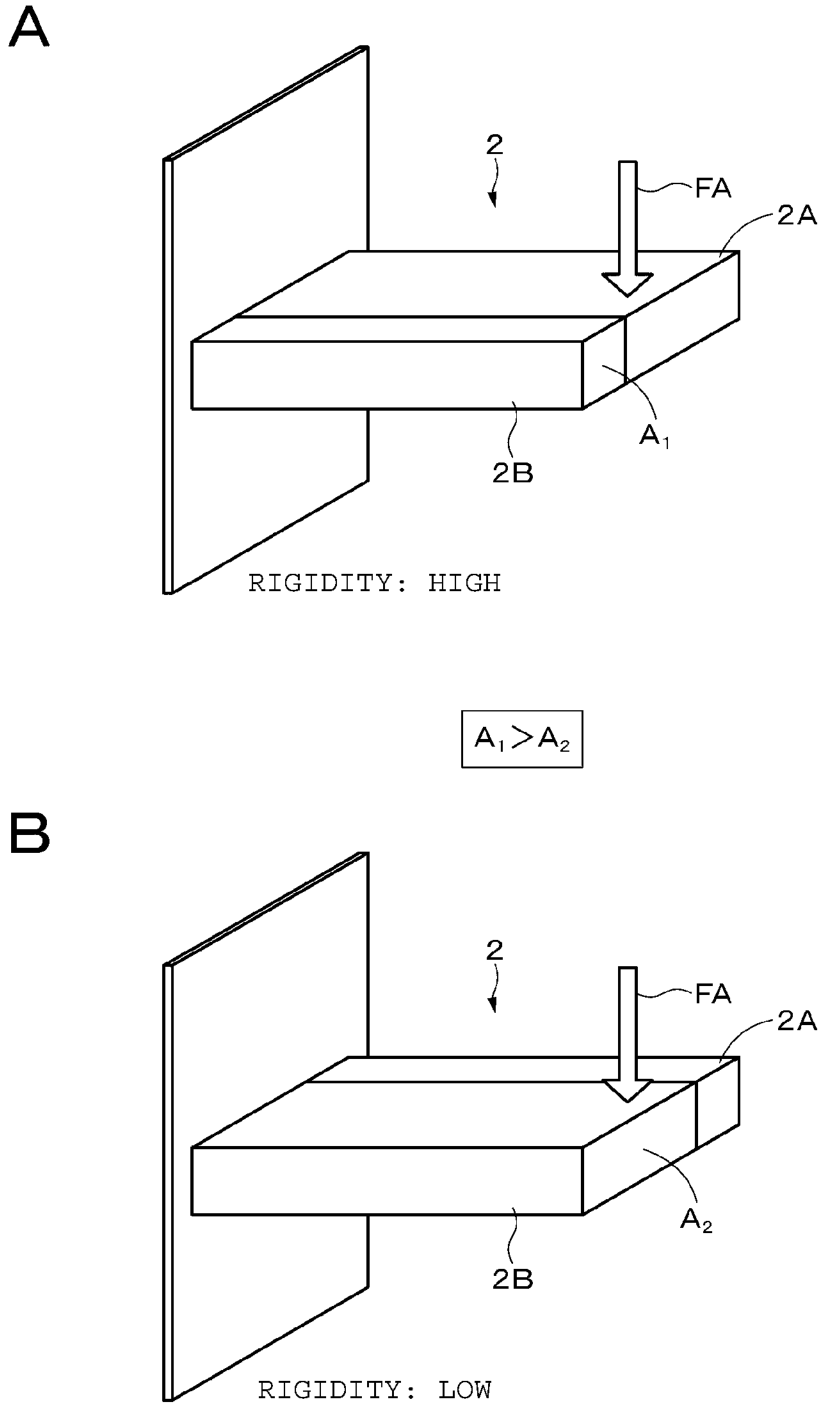
FIG. 2 includes views A and B which are diagrams relating to the present application according to an embodiment.

FIGS. 2A and 2B illustrate a cushioning member 2 that is another example of the cushioning member. The cushioning member 2 has a configuration in which a hard member 2A and a soft member 2B are continuously formed in a plane direction. The example shown in FIG. 2A is an example of the cushioning member in which a volume $A_1$ occupied by the soft member 2B in the cushioning member 2 is smaller than the volume of the hard member 2A. The example shown in FIG. 2B is an example of the cushioning member in which a volume $A_2$ occupied by the soft member 2B in the cushioning member 2 is larger than the volume of the hard member 2A.

The rigidity against a force FA in a case where the downward force FA is applied to a free end side of the cushioning member 1 is considered. In a case where the examples shown in FIGS. 1A and 1B are compared with each other, the cushioning member having a smaller thickness of the soft member 1B (the cushioning member 1 shown in FIG. 1B) has higher rigidity. Further, in a case where the examples shown in FIGS. 2A and 2B are compared with each other, the cushioning member having a smaller volume of the soft member 2B (the cushioning member 2 shown in FIG. 2A) has higher rigidity. In general, the larger an area of the cushioning member, and the smaller the thickness, the lower the rigidity of the cushioning member. Therefore, it is necessary to pay attention to the shape of the cushioning member. In other words, when the area of the cushioning member is reduced in order to increase the rigidity of the cushioning member, there is a possibility that the vibration resistance characteristics required for the cushioning member will not be satisfied. Further, when the thickness of the hard member is increased, there is a possibility that the size of the cushioning member will increase.

Figure 3:
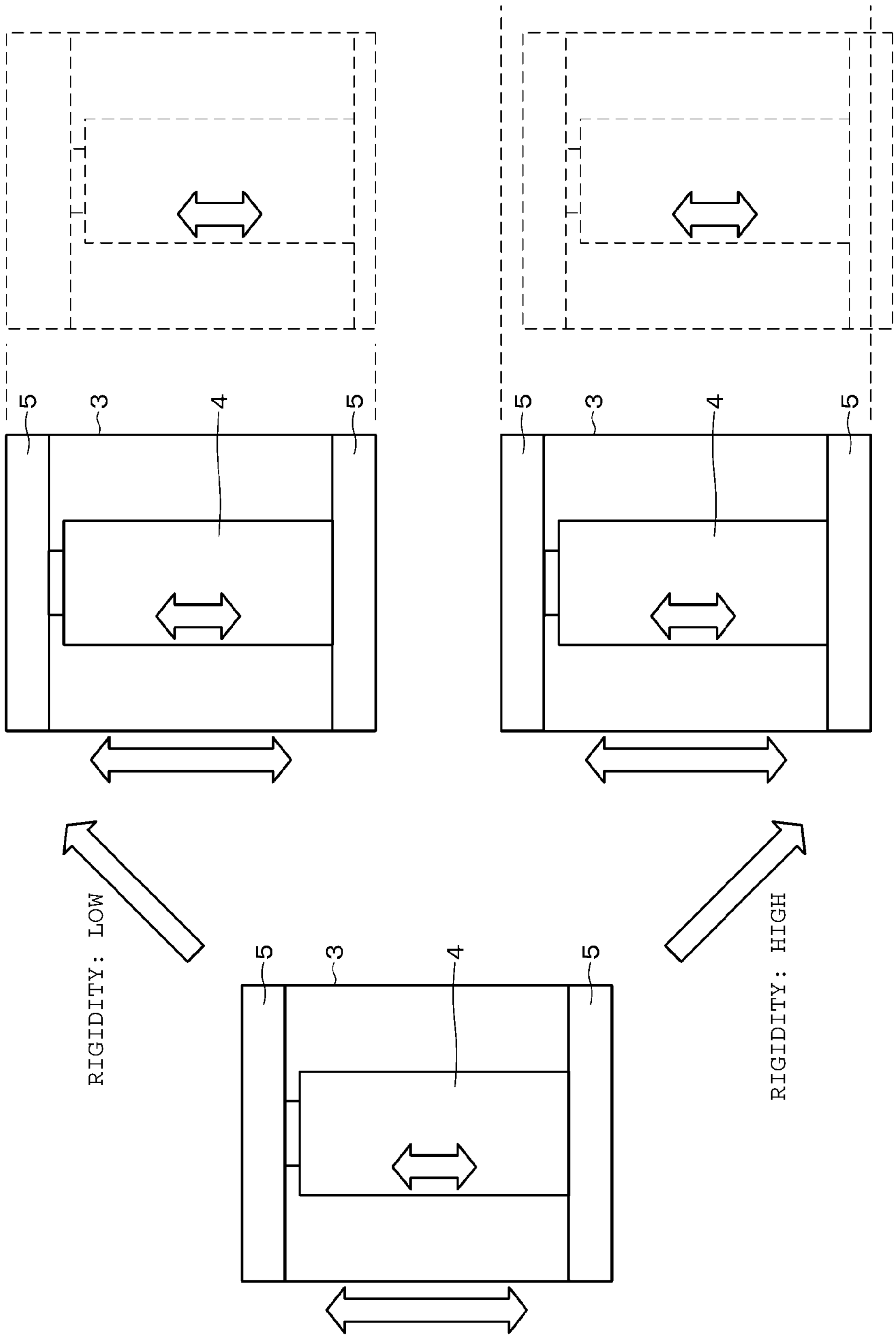
FIG. 3 is a diagram relating to the present application according to an embodiment.

It is also necessary to pay attention to resonance of the cushioning member. Here, resonance is a phenomenon that occurs when a natural frequency of a structure coincides with a frequency input from the outside. When resonance occurs, an external input is transmitted to the structure with an amplitude many times, and in extreme cases, the structure may be damaged. For example, in a case where a rubber member with low rigidity or the like is used as a cushioning member of the battery pack, such cushioning member can attenuate vibration in a high frequency band, but causes resonance in a low frequency band. For example, as shown in FIG. 3, a battery pack in which a battery 4 is housed in an exterior case 3 and a cushioning member 5 is disposed between the exterior case 3 and the battery 4 is considered. When the rigidity of the cushioning member 5 is low, as schematically shown on an upper right side of FIG. 3, the exterior case 3 and the battery 4 move in different ways, so that the vibration resistance characteristics are deteriorated. Therefore, it is desirable to improve the rigidity of the cushioning member 5 so that the exterior case 3 and the battery 4 move in the same way as schematically shown on a lower right side of FIG. 3. In particular, in consideration of application of the battery pack (for example, an electric vehicle or an electric tool), the battery pack is required to be safety against vibration in the low frequency band (for example, 200 Hz or less) rather than the high frequency band. Therefore, a structure that increases the natural frequency and does not cause resonance by increasing the rigidity of an internal structure of the battery pack is required. For this reason, it is required to increase the rigidity of the cushioning member as much as possible.

In the technique described in the Background section, a cushioning member is formed by mixing a highly thermally conductive resin with a rubber material. A rubber member containing a thermally conductive material is excellent in heat dissipation characteristics, but has a specific gravity of about 1.0 to 3.5 and a Young's modulus of less than 1.0 MPa. In other words, it becomes a cushioning member with a high specific gravity, which is disadvantageous in a battery pack that is requires to be lightweight. Further, the rubber material has a low Young's modulus and thus has low rigidity. Low rigidity leads to a lower resonance point of the internal structure, which may cause resonance in the low frequency band in which the battery pack can be used, potentially damaging the internal structure of the battery pack.

Further, in a further technique described in the Background section, a cushioning member is composed of two thermally conductive members, a soft member and a hard member. Both of the two members have high thermal conduction characteristics and thus are excellent in heat dissipation characteristics, but a general thermally conductive member has a specific gravity of about 1.0 to 3.5 and a Young's modulus of less than 1.0 MPa. Since the cushioning member is composed of materials with a high specific gravity, it is disadvantageous in a battery pack that is required to be lightweight. Further, while the Young's modulus of a hard thermally conductive member may be 10 to 50 MPa or more, the Young's modulus of a soft thermally conductive member is less than 1.0 MPa. Further, in the cushioning member, the two members are stacked in the thickness direction, and the thickness of each cushioning member becomes thinner, so that the rigidity is reduced as compared with that of the cushioning member composed of a uniform material. As a result, the resonance point of the internal structure decreases, resonance occurs in the low frequency band in which the battery pack can be used, and the internal structure of the battery pack may be damaged. Based on the above, the present application will be described in further detail below based on one or more embodiments.

Figure 4:
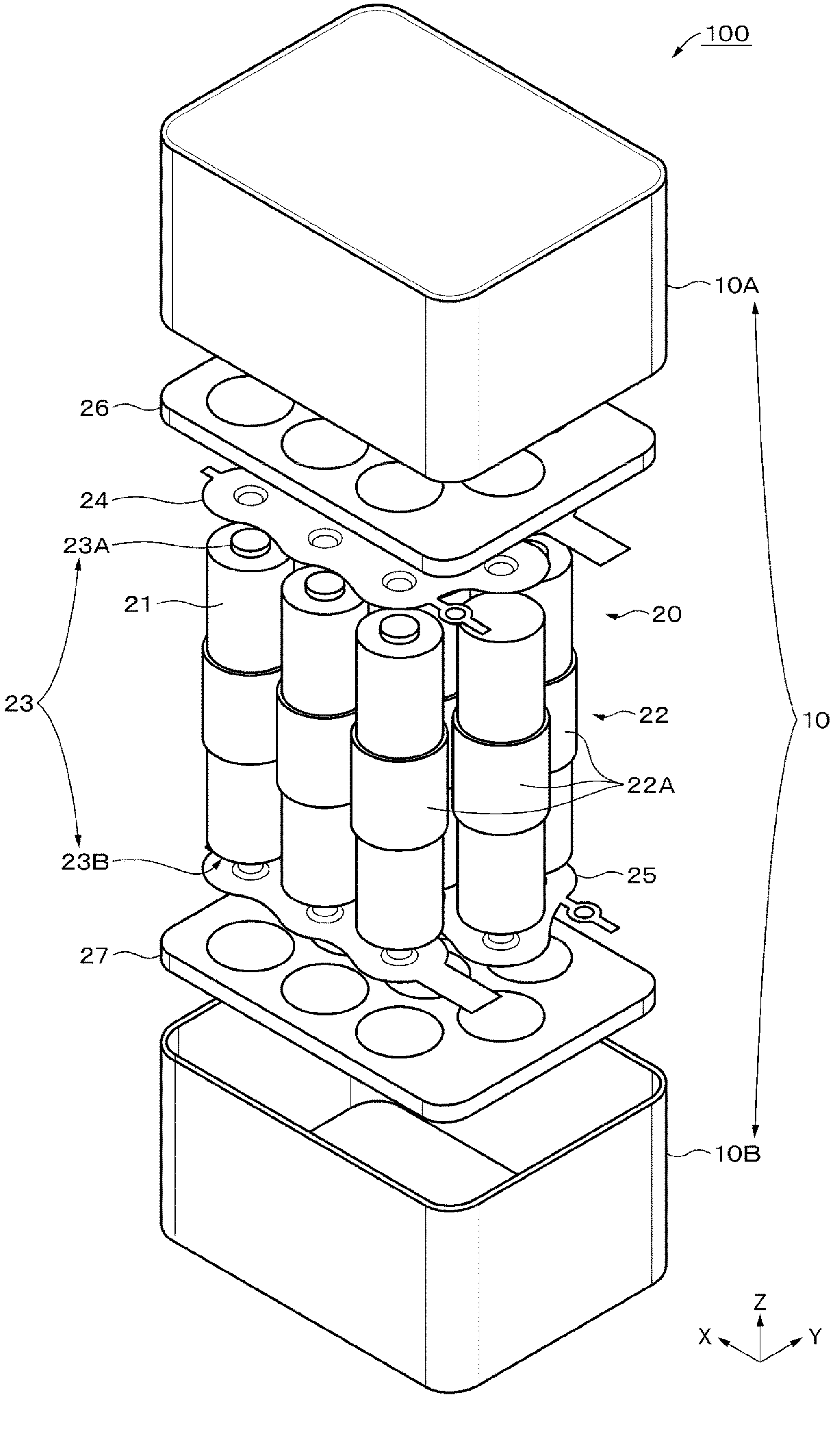
FIG. 4 is an exploded perspective view of a battery pack according to an embodiment.

FIG. 4 is a view illustrating an appearance of the battery pack (a battery pack 100) according to the first embodiment. The battery pack 100 has an exterior case 10 in a substantially box-like shape. The exterior case 10 is formed of resin, for example. The exterior case 10 includes an exterior upper case 10A having a lid shape and a substantially rectangular shape in top view, and an exterior lower case 10B having a case shape with an open upper surface. The exterior upper case 10A and the exterior lower case 10B are integrated by, for example, being fastened with fastening screws (not illustrated). An external positive electrode terminal and an external negative electrode terminal (not illustrated) are led out to the outside of the exterior case 10. Such external positive electrode terminal and external negative electrode terminal are connected to a load of the battery pack 100 and a charging device.

A battery unit 20 is housed in the exterior case 10. The battery unit 20 includes a battery 21 and a battery holder 22 that houses and holds the battery 21. The battery 21 is, for example, a cylindrical lithium ion secondary battery, but a battery other than a lithium ion secondary battery may be used as the battery 21. The battery 21 has a positive electrode terminal 23A at one end and a negative electrode terminal 23B at the other end. In the following description, in a case where either the positive electrode or the negative electrode may be used, it is appropriately referred to as the terminal 23.

In the present embodiment, the battery unit 20 includes nine batteries 21. For example, three batteries 21 are disposed in an X-axis direction in FIG. 4 such that the positive electrode terminal 23A faces upward. Three batteries 21 are disposed at positions adjacent to the three batteries 21 in a Y-axis direction such that the positive electrode terminal 23A faces downward. Three batteries 21 are disposed at positions adjacent to the three batteries 21 in the Y-axis direction such that the positive electrode terminal 23A faces upward.

The battery holder 22 is composed of, for example, resin. The battery holder 22 holds the battery 21 at a predetermined positions and secures insulation between each battery. The battery holder 22 has the number of cylindrical portions 22A corresponding to the number of the battery 21. In the present embodiment, the nine cylindrical portions 22A are integrated, but may have separate configurations. A diameter of the cylindrical portions 22A is substantially equal to an outer diameter of the battery 21. The battery 21 is inserted into the cylindrical portion 22A. As a result, a side surface near the center of the battery 21 is held in the cylindrical portion 22A.

A tab 24, which is an example of a conductive member, is connected to one terminal 23 of the battery 21, for example, the terminal 23 disposed on an upper side in a Z-axis direction. Further, a tab 25 is connected to the other terminal 23 of the battery 21, for example, the terminal 23 disposed on a lower side in the Z-axis direction. The tab 24 and the tab 25 electrically connect the nine batteries 21 to each other. In the present embodiment, a set (three sets) of three batteries 21 connected in series is connected in parallel (three series and three parallel connections). The tab 24 and the tab 25 are connected to the terminal 23 by a known method such as laser welding or resistance welding.

A spacer member is disposed between the exterior case 10 and the battery 21. For example, a spacer member 26 is disposed between the exterior upper case 10A and the terminal 23 of the battery 21 located on the upper side in the Z-axis direction. Further, a spacer member 27 is disposed between the exterior lower case 10B and the terminal 23 of the battery 21 located on the lower side in the Z-axis direction. The spacer member 26 and spacer member 27 are members that improve the vibration resistance characteristics and heat dissipation characteristics of the battery pack 100 in a well-balanced manner, and also function as a cushioning member.

Figure 6:
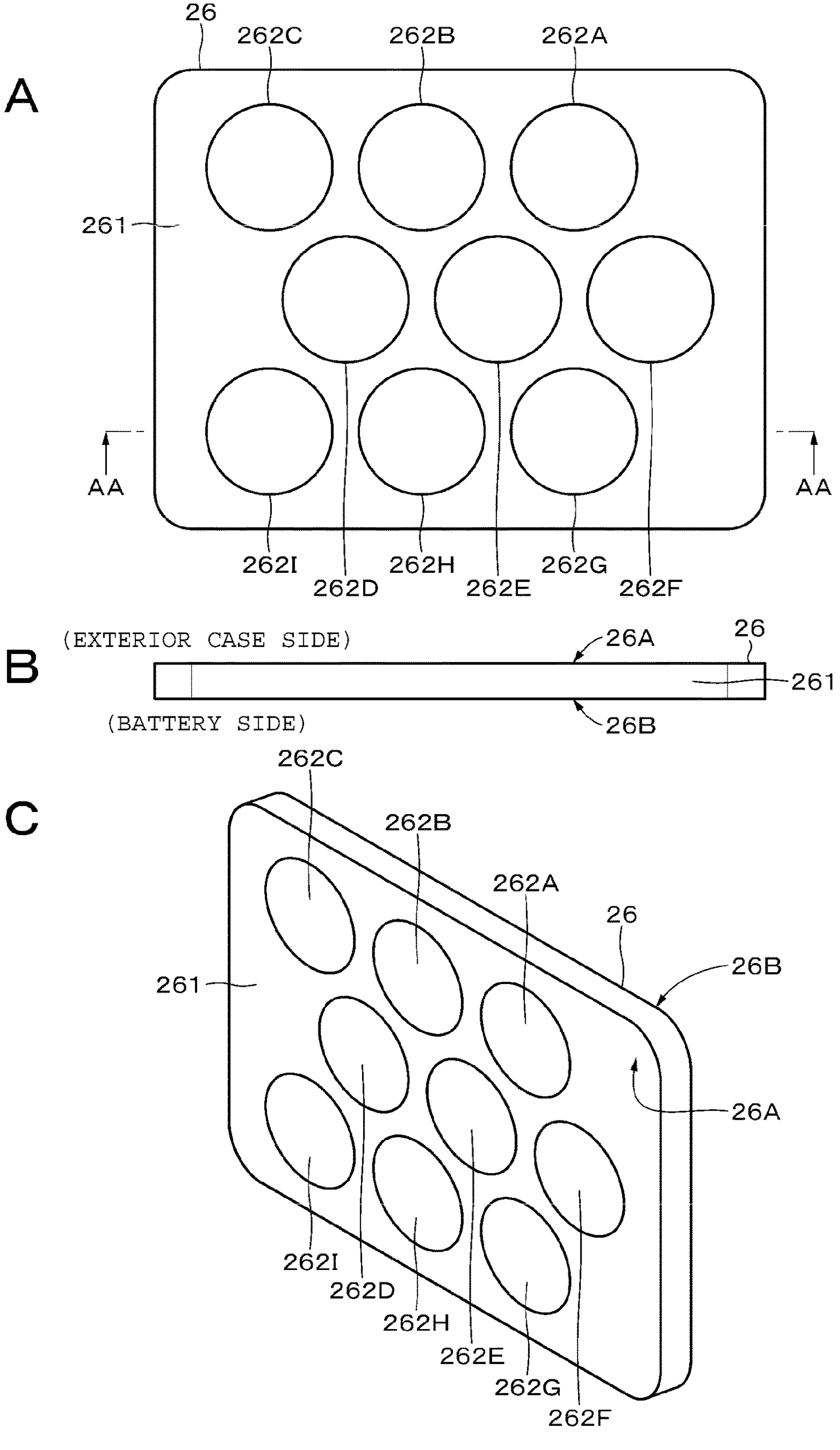
FIG. 6 includes views A to C which are diagrams the spacer member according to an embodiment.
Figure 7:
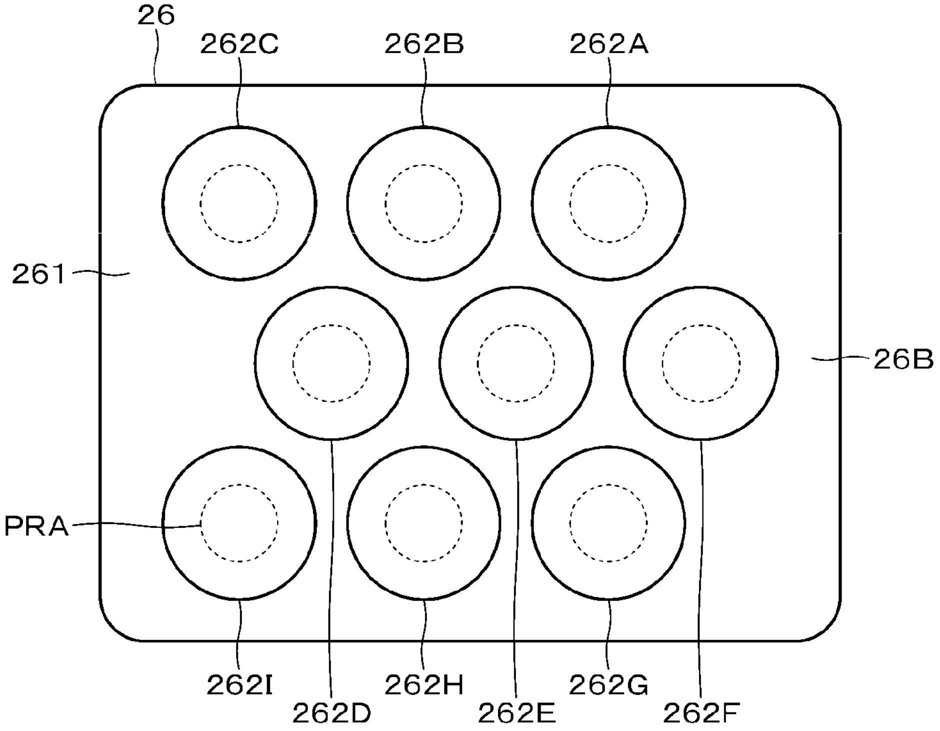
FIG. 7 includes views A and B which are diagrams relating to the spacer member according to an embodiment.
Figure 7:
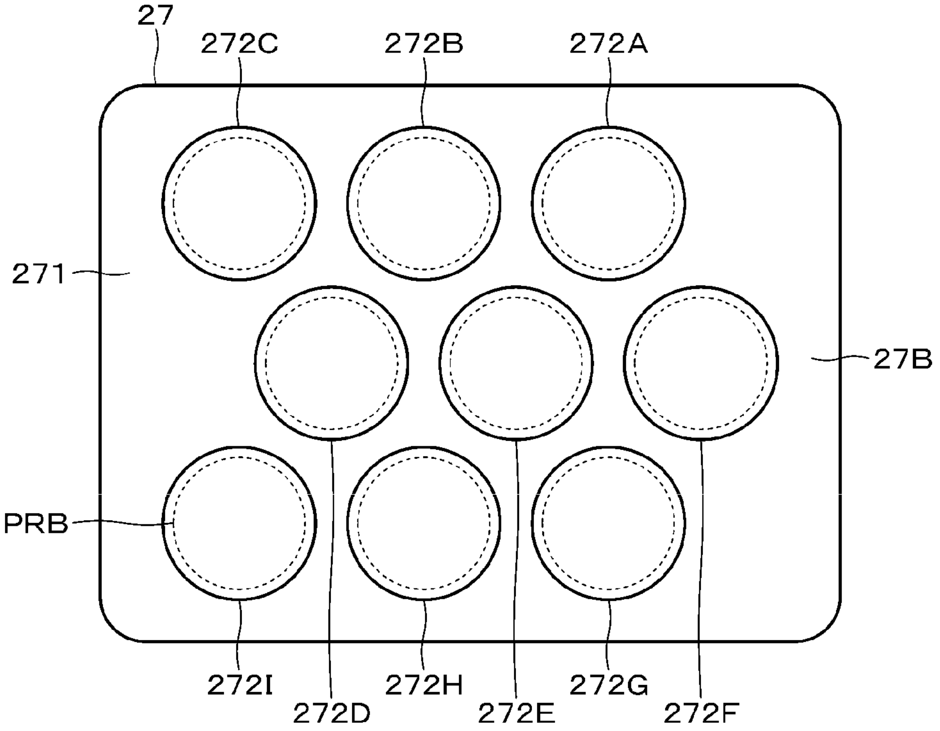

Next, the spacer member according to the present embodiment will be described with reference to FIGS. 5 to 7 in addition to FIG. 4. In the following description, the spacer member 26 will be described as an example unless otherwise specified, but the contents described below also apply to the spacer member 27.

Figure 5:
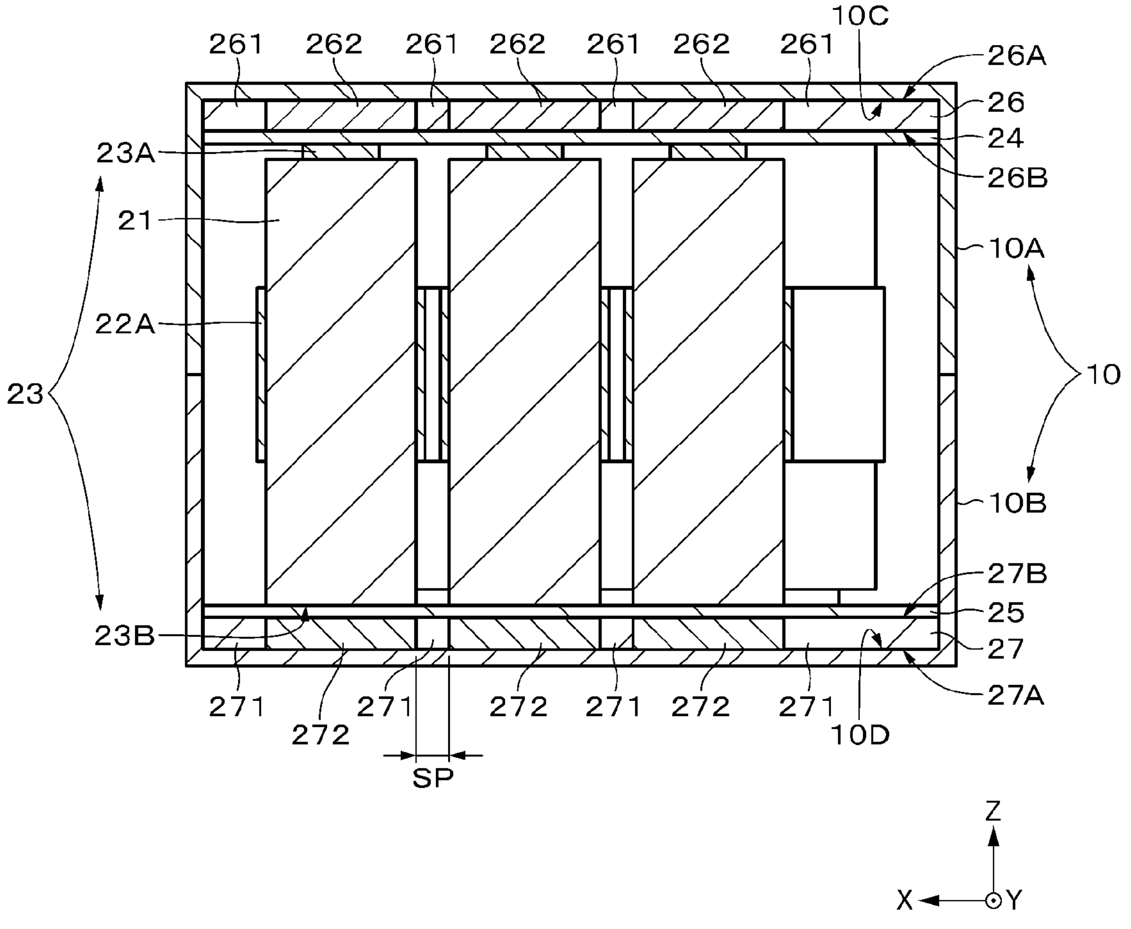
FIG. 5 is a diagram relating to a spacer member according to an embodiment.

FIG. 5 is a sectional view illustrating a section of the battery pack 100 taken along a cutting line along the X-axis direction (for example, a cutting line AA-AA in FIG. 6A) so as to include three batteries 21 aligned in the X-axis direction. FIG. 6A is a plan view of the spacer member 26 according to the present embodiment, FIG. 6B is a side view of the spacer member 26 according to the present embodiment, and FIG. 6C is a perspective view of the spacer member 26 according to the present embodiment. FIG. 7A is a diagram for describing the positional relationship between the spacer member 26 and the terminal 23 of the battery 21, and FIG. 7B is a diagram for describing the positional relationship between the spacer member 27 and the terminal 23 of the battery 21. Note that, the illustration of an internal configuration of the battery 21 in the sectional view is appropriately simplified.

As shown in FIGS. 6A to 6C, the spacer member 26 has a thin plate-like shape as a whole. The spacer member 26 has a main surface 26A and a main surface 26B on the opposite side. The main surface 26A is a surface on a side of the exterior upper case 10A, and the main surface 26B is a surface on the side of the battery 21.

Further, the spacer member 26 includes a foam 261 that has a substantially rectangular outer edge as a whole and a plate-like shape, and a highly thermally conductive member 262 that is provided inside the foam 261 in a substantially circular shape. The highly thermally conductive member 262 according to the present embodiment includes nine highly thermally conductive members (highly thermally conductive members 262A to 262I). Note that, in the following description, in a case where it is not necessary to particularly distinguish individual highly thermally conductive members, they are collectively referred to as the highly thermally conductive member 262 as appropriate. In the present embodiment, the foam 261 corresponds to a first insulating member, and the highly thermally conductive member 262 corresponds to a second insulating member. Note that, the spacer member 27 also includes a foam 271 and a highly thermally conductive member 272.

As shown in FIG. 5, the foam 261 and the highly thermally conductive member 262 are not laminated in the thickness direction (Z-axis direction), but are alternately formed in the plane direction (X-axis direction). The thicknesses of the foam 261 and the highly thermally conductive member 262 are substantially the same. In other words, the main surface 26A of the spacer member 26 is formed by the main surface of the foam 261 and one main surface of the highly thermally conductive member 262, and the main surface 26B of the spacer member 26 is formed by the main surface of the foam 261 and the other main surface of the highly thermally conductive member 262.

Further, as shown in FIG. 6A, in the present embodiment, the nine highly thermally conductive members 262 are disposed inside the foam 261. Specifically, the foam 261 is disposed to surround each highly thermally conductive member 262, and more specifically, the highly thermally conductive member 262 is disposed in a void provided in the foam 261, and an outer periphery of the highly thermally conductive member 262 is in contact with an inner periphery of the void.

As shown in FIG. 5, the main surface 26A of the spacer member 26 is in contact with an inner surface 10C on the upper side of the exterior upper case 10A. In other words, the main surfaces of the foam 261 and the highly thermally conductive member 262 are in contact with the inner surface 10C of the exterior upper case 10A. More specifically, the spacer member 26 is disposed to cover the inner surface 10C on the upper side of the exterior upper case 10A. The inner surface 10C of the exterior upper case 10A is a surface facing the terminal 23 (the positive electrode terminal 23A in the example shown in FIG. 5) of the battery 21. In the present description, facing means facing each other in a case where other configurations (which may not be necessary) interposed therebetween are eliminated. Further, a main surface 27A of the spacer member 27 is in contact with an inner surface 10D on the lower side of the exterior lower case 10B. In other words, the main surfaces of the foam 271 and the highly thermally conductive member 272 are in contact with the inner surface 10D of the exterior lower case 10B. More specifically, the spacer member 27 is disposed to cover the inner surface 10D on the lower side of the exterior lower case 10B. The inner surface 10D of the exterior lower case 10B is a surface facing the terminal 23 (the negative electrode terminal 23B in the example shown in FIG. 5) of the battery 21.

Furthermore, as shown in FIG. 5, the highly thermally conductive member 262 of the spacer member 26 is disposed at a position facing the positive electrode terminal 23A. More specifically, as shown in FIG. 7A, the highly thermally conductive member 262 is disposed at a position overlapping a portion where a terminal surface PRA, which is an end surface of the positive electrode terminal 23A, is projected onto the main surface 26B of the spacer member 26.

Furthermore, as shown in FIG. 5, the highly thermally conductive member 272 of the spacer member 27 is disposed at a position facing the negative electrode terminal 23B. More specifically, as shown in FIG. 7B, the highly thermally conductive member 272 is disposed at a position overlapping a portion where a terminal surface PRB of the negative electrode terminal 23B is projected onto the main surface 27B of the spacer member 27.

Furthermore, as shown in FIG. 5, the foam 261 and the foam 271 are respectively disposed at positions corresponding to SP between the batteries 21, that is, in a vertical direction of the SP between the batteries 21.

The foam 261 and the highly thermally conductive member 262 according to the present embodiment satisfy the following relationship.

For specific gravity, the foam 261 (an example of the first insulating member) <the highly thermally conductive member 262 (an example of the second insulating member)

is satisfied.

Therefore, in a case of the same volume, mass of the foam 261 is smaller than mass of the highly thermally conductive member 262.

As a method for measuring specific gravity, JIS Z 8807 "Methods for measuring density and specific gravity of solid" is used.

For Young's modulus, the foam 261 (an example of the first insulating member) >the highly thermally conductive member 262 (an example of the second insulating member)

is satisfied.

Therefore, as a proportion of the foam 261 in the spacer member 26 increases, the rigidity of the spacer member 26 increases.

As a method for measuring Young's modulus, for a resin material, JIS K 7161-1 "Plastics-Determination of tensile properties" and JIS K 7161-2 "Plastics-Determination of tensile properties" are used.

As a method for measuring Young's modulus, for a rubber member, JIS K 6250 "Rubber-General procedures for preparing and conditioning test pieces for physical test methods", JIS K 6251 "Rubber, vulcanized or thermoplastic-Determination of tensile stress-strain properties", and JIS K 6272 "Rubber-Tensile, flexural and compression test equipment (constant rate of traverse)" are used.

For thermal conductivity, the foam 261 (an example of the first insulating member) <the highly thermally conductive member 262 (an example of the second insulating member)

is satisfied.

Therefore, the highly thermally conductive member 262 transfers heat more easily than the foam 261.

As a method for measuring thermal conductivity, JIS A 1412-1 "Test method for thermal resistance and related properties of thermal insulations" or JIS A 1412-2 "Test method for thermal resistance and related properties of thermal insulations" is used.

As the foam 261, for example, a foam containing at least one of polypropylene, polyethylene, polyphenylene ether, polyester, and polyurethane can be used.

As the highly thermally conductive member 262, a member having flexibility (bending property) in which a thermally conductive filler is contained in a base material can be used. Examples of the base material include those composed of at least one of silicone rubber, acrylic rubber, urethane rubber, styrene-butadiene rubber, and elastomer. Further, examples of the thermally conductive filler include carbon, graphite, alumina, aluminum hydroxide, boron nitride, and ceramic, or a combination of two or more thereof.

As an example, as the foam 261 and the foam 271, those having a specific gravity within the range of 0.05 to 0.3, a Young's modulus within the range of 30 to 100 MPa, and a thermal conductivity within the range of 0.01 to 0.3 W/m·K are used. Further, as the highly thermally conductive member 262 and the highly thermally conductive member 272, those having a specific gravity within the range of 1.5 to 3.5, a Young's modulus within the range of 0.05 to 1.0 MPa, and a thermal conductivity within the range of 1.0 to 15 W/m·K are used.

Figure 8:
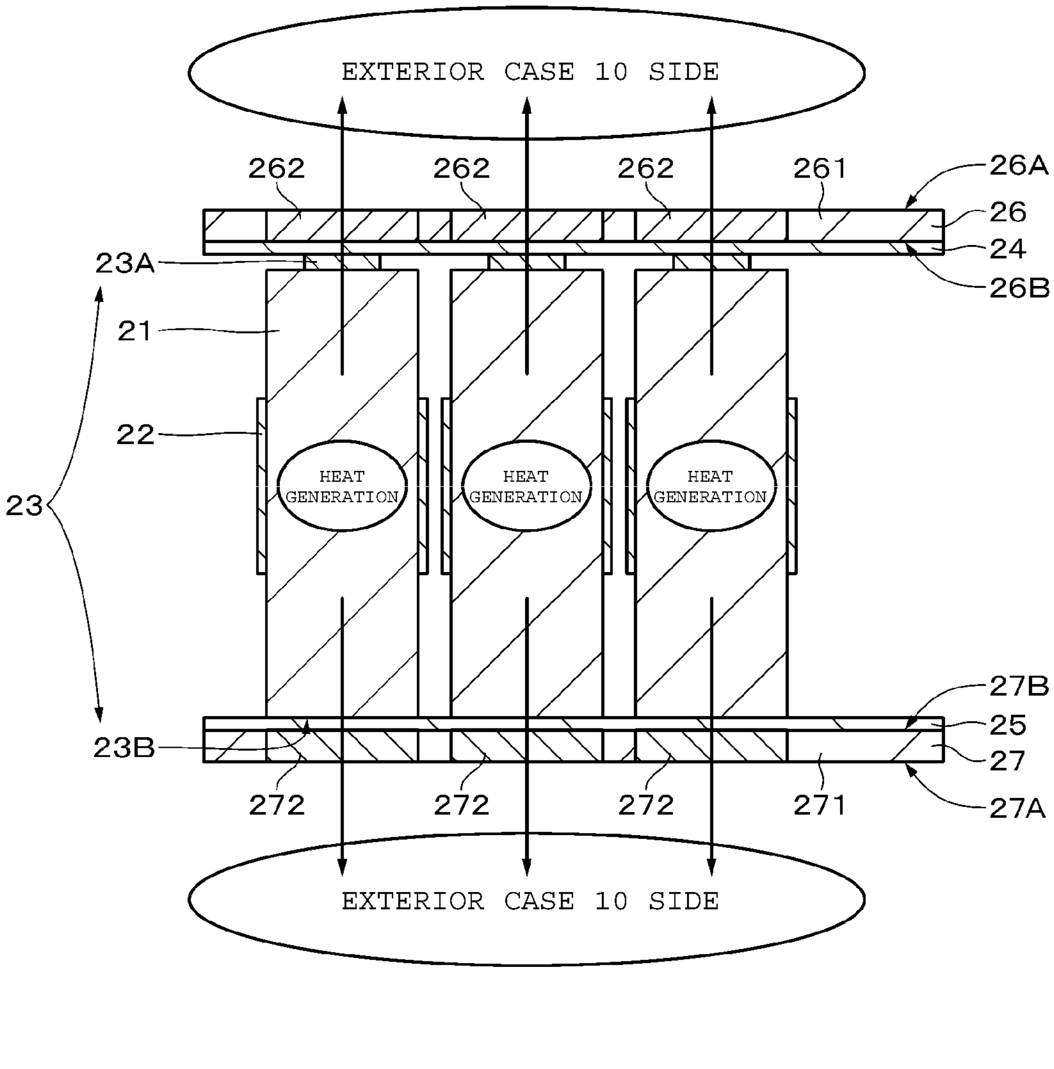
FIG. 8 is a diagram relating to an operation of the battery pack according to an embodiment.

The operation of the battery pack 100 according to the present embodiment will be described with reference to FIG. 8. As shown in FIG. 8, in the present embodiment, the highly thermally conductive members 262 and 272 are disposed at positions facing the terminals 23 of the battery 21. Specifically, the highly thermally conductive member 262 is in contact with a portion where the tab 24 and the terminal 23 are welded. Further, the highly thermally conductive member 272 is in contact with a portion where the tab 25 and the terminal 23 are welded. With such a configuration, as schematically shown in FIG. 8, it becomes possible to effectively transfer the heat generated by the battery 21 to the exterior case 10 through the highly thermally conductive members 262 and 272. As a result, the heat dissipation characteristics of the battery pack 100 can be improved.

Next, the effects obtained by the present embodiment will be described. According to the battery pack 100 according to the present embodiment, various characteristics required for the battery pack can be improved in a well-balanced manner. Specifically, the heat dissipation characteristics, vibration resistance characteristics, and weight reduction characteristics required for the battery pack can be improved in a well-balanced manner.

Figure 9:
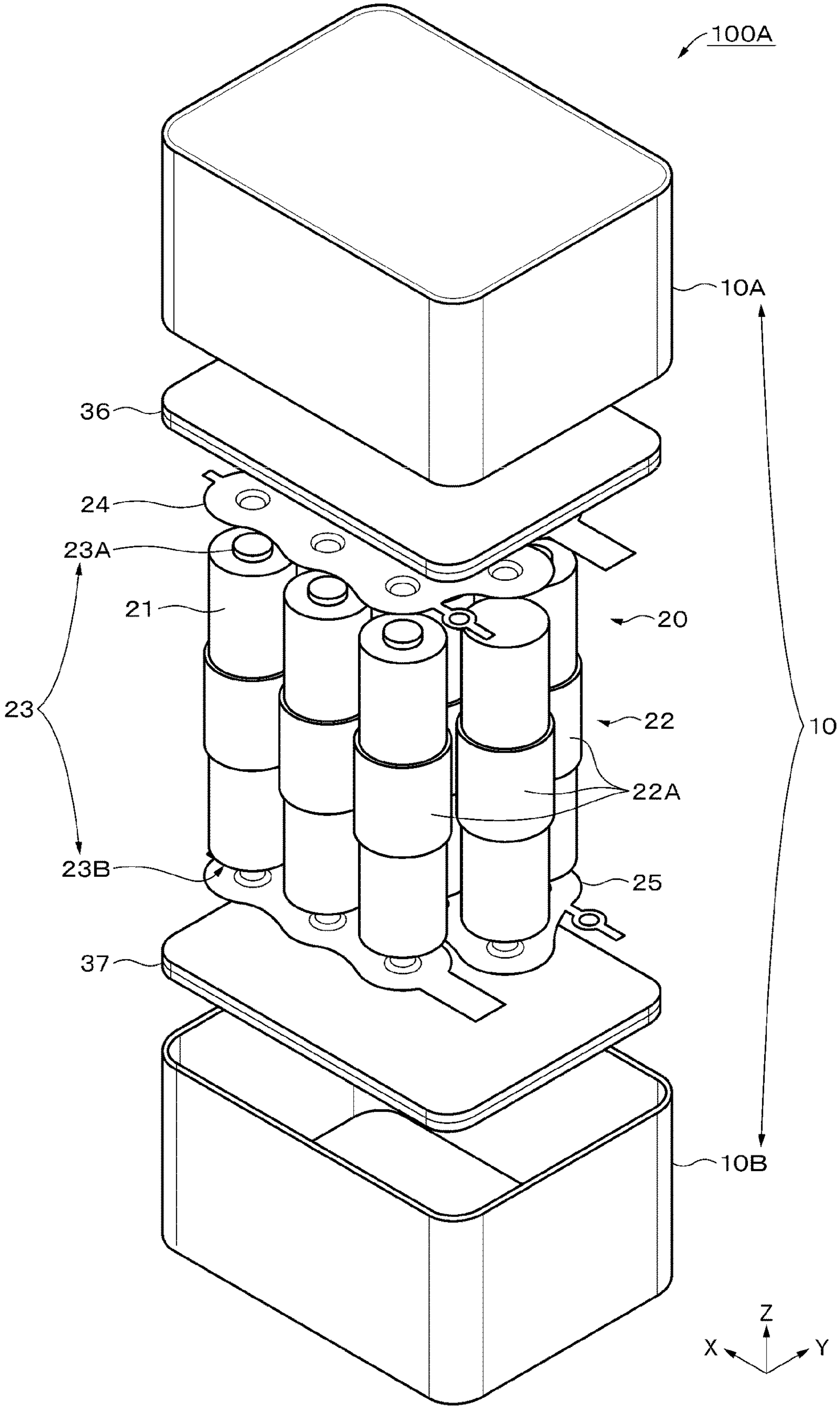
FIG. 9 is an exploded perspective view of a battery pack according to a comparative example.

A point that various characteristics can be improved by the battery pack 100 according to the present embodiment will be described in comparison with a comparative example. FIG. 9 is an exploded perspective view for describing a configuration example of a battery pack (a battery pack 100A) according to a comparative example. Note that, in the battery pack 100A according to the comparative example, the same reference numerals are given to the same or similar configurations as those of the battery pack 100, and redundant description will be appropriately omitted.

Figure 10:
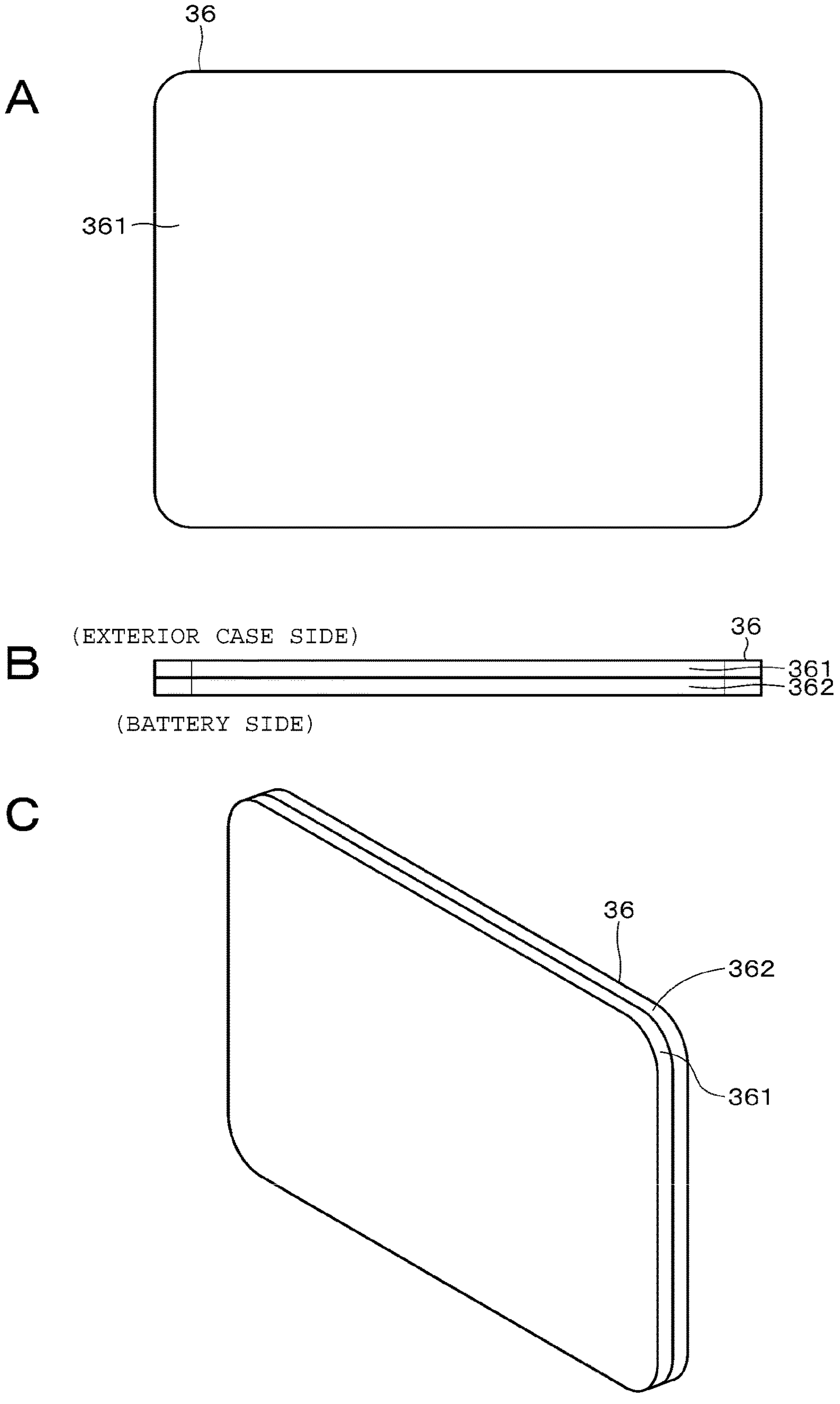
FIG. 10 includes views A to C which are diagrams relating to a spacer member according to a comparative example.

As shown in FIG. 9, the battery pack 100A includes spacer members 36 and 37 instead of the spacer members 26 and 27. FIGS. 10A to 10C are diagrams for describing a configuration example of the spacer member 36. FIG. 10A is a front view of the spacer member 36, FIG. 10B is a side view of the spacer member 36, and FIG. 10C is a perspective view of the spacer member 36. Note that, the matters described below can also be applied to the spacer member 37.

The spacer member 36 includes a foam 361 and a highly thermally conductive member 362. As shown in FIG. 10B, unlike the spacer member 26, the foam 361 and the highly thermally conductive member 362 are laminated in the thickness direction. The foam 361 is disposed on the side of the exterior case 10, and the highly thermally conductive member 362 is disposed on the side of the battery 21 (the tab 24).

Figure 11:
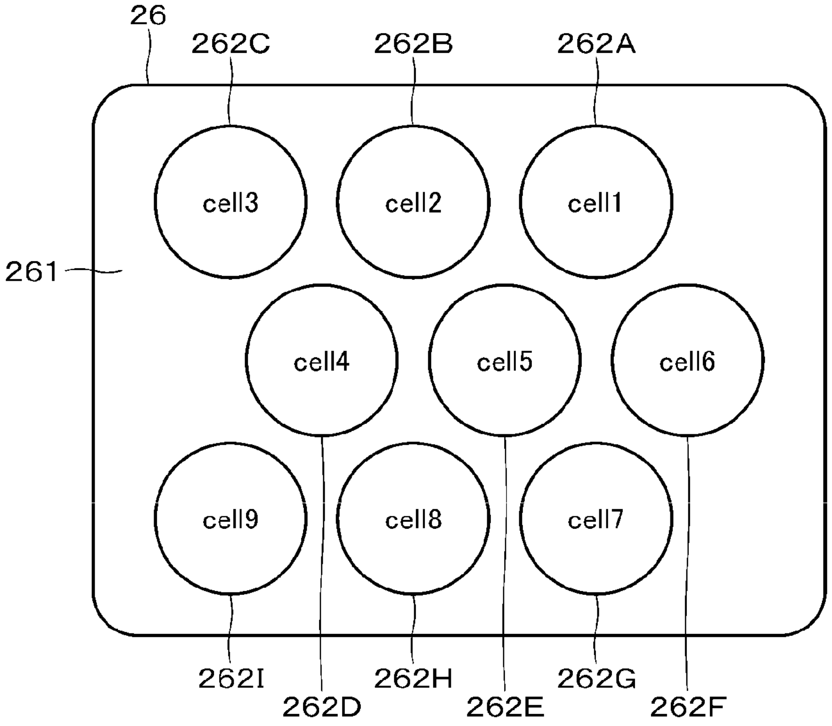
FIG. 11 includes views A and B which are diagrams for describing an example of a simulation method for evaluating heat dissipation characteristics.
Figure 11:
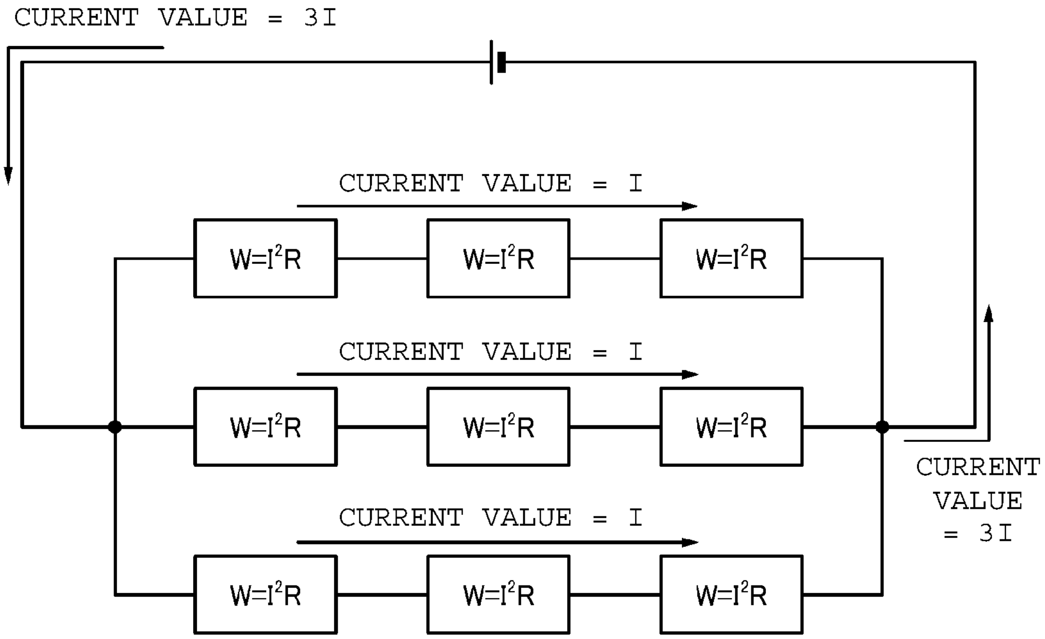

First, evaluation results of heat dissipation characteristics will be described. Evaluation of various characteristics of the battery pack according to the present embodiment and the battery pack according to the comparative example was performed based on simulation. An example of a simulation method for evaluating heat dissipation characteristics will be described with reference to FIGS. 11A and 11B. The nine batteries 21 connected in three parallel three series are numbered. For example, as shown in FIG. 11A, cell 1 to cell 9 are assigned as numbers to the nine batteries 21. As shown in FIG. 11B, a simulation was performed in which a battery load device was connected to the nine batteries 21 (schematically indicated by a rectangular frame), and a current with a current value=3I was caused to flow from the battery load device. Joule heat ($W=I^2R$) was calculated from internal resistance per battery and the current value of the current flowing through the battery, and thermal analysis was performed to measure a battery surface temperature corresponding to Joule heat by simulation. At this time, it was assumed that the internal resistance and flowing current value of each of the nine batteries were all equal.

Figure 12:
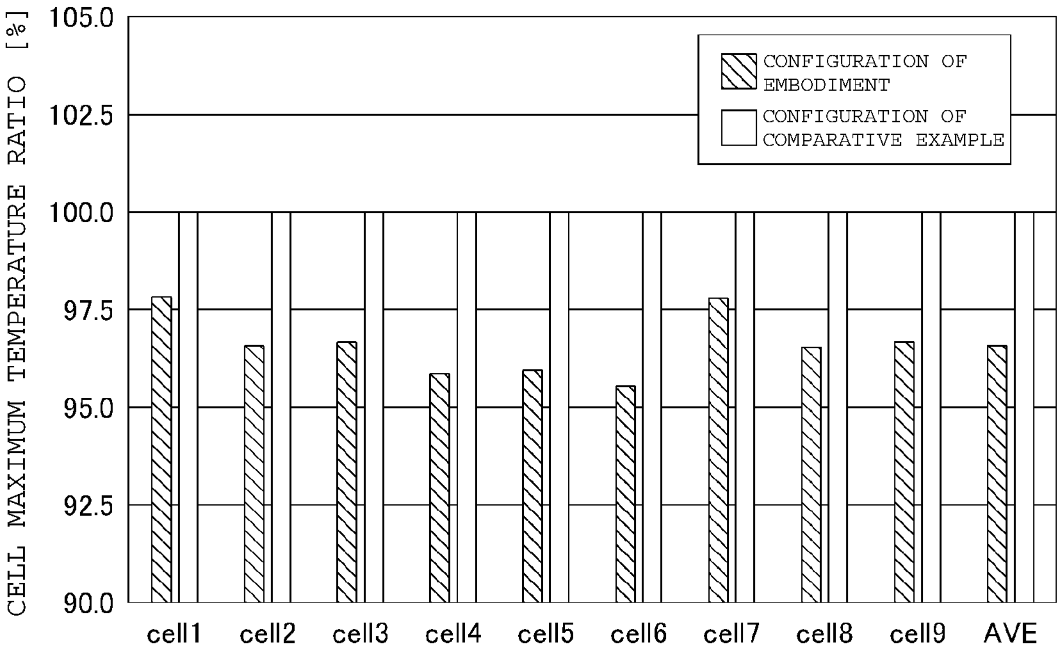
FIG. 12 is a diagram illustrating evaluation results of heat dissipation characteristics.

The evaluation results of heat dissipation characteristics are shown in FIG. 12. A horizontal axis of a bar graph shown in FIG. 12 indicates a cell number, and a vertical axis indicates a cell maximum temperature ratio (%). Two bars are shown for each cell number. A white bar among the two bars is a surface temperature of the battery having the configuration according to the comparative example, and a hatched bar among the two bars is a surface temperature of the battery having the configuration according to the present embodiment. In the present example, the ratio of the surface temperature of the battery according to the present embodiment when the surface temperature of the battery according to the comparative example is 100% is shown relatively.

As shown in FIG. 12, the surface temperature of the battery according to the present embodiment is lower than the surface temperature of the battery according to the comparative example by about 2% to 5% (about 3% on average) regardless of the cell number, in other words, regardless of the position of the nine batteries connected in three series three parallel. This is considered to be because in the battery pack according to the comparative example, the heat of the highly thermally conductive member 362 is blocked by the foam 361 having heat insulating properties, and thus cannot be efficiently transferred to the exterior case 10. On the other hand, in the battery pack according to the present embodiment, there is no configuration that blocks heat transfer, and the heat of the battery can be effectively transferred to the exterior case 10 through the highly thermally conductive members 262 and 272, so that it is considered that a rise in the temperature of the battery can be suppressed.

Next, evaluation results of vibration resistance characteristics will be described. Simulation conditions are as follows. Two surfaces of a top surface and a bottom surface of the exterior case of the battery pack (battery packs 100, 100A) were fixed. Then, the battery pack was vibrated in a direction substantially parallel to a longitudinal direction of the battery as an excitation direction, and the resonance point of the battery at this time was calculated. A method for measuring the resonance point is as follows. The battery pack is fixed to a vibration tester, and the frequency is swept from the low frequency band to the high frequency band for excitation. At this time, a sensor is attached to an internal structure such as a battery or a tab to measure acceleration. Further, a sensor is also attached to the exterior case to measure acceleration. A relative acceleration (hereinafter, also referred to as relative acceleration as appropriate) between the measured acceleration of the internal structure and the acceleration of the exterior case was compared, and the frequency at which a peak value of the difference was obtained was defined as the resonance point.

Further, in both the battery packs 100 and 100A, a volume ratio of the highly thermally conductive member and the foam was set to 1:1, and the thicknesses of the spacer members 26 and 36 of the respective battery packs were set to be the same.

Figure 13:
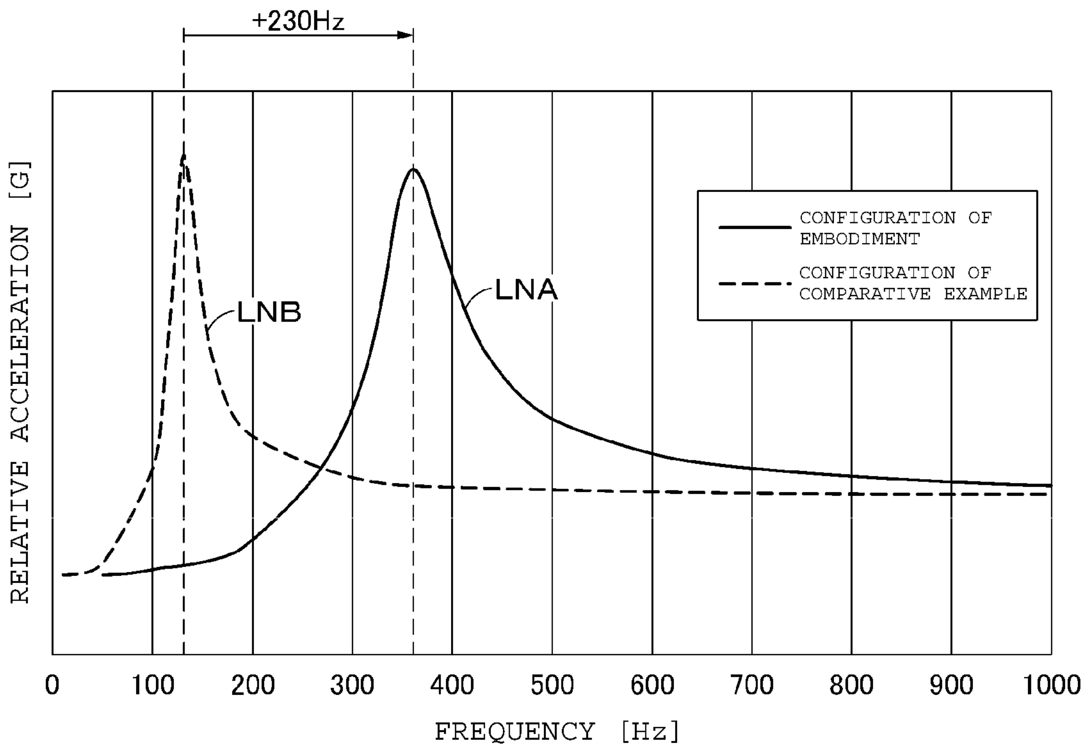
FIG. 13 is a diagram illustrating evaluation results of vibration resistance characteristics.

The evaluation results of vibration resistance characteristics are shown in FIG. 13. The horizontal axis of the graph shown in FIG. 13 indicates the frequency, and the vertical axis indicates relative acceleration. Further, in the graph of FIG. 13, a line LNA indicates the results of the vibration resistance characteristic of the battery pack according to the present embodiment, and a line LNB indicates the results of the vibration resistance characteristic of the battery pack according to the comparative example.

As shown in FIG. 13, the battery pack 100 according to the present embodiment has a resonance point of about 360 Hz, which can be about 230 Hz higher than the resonance point (about 130 Hz) of the battery pack 100A according to the comparative example. In other words, the battery pack 100 according to the present embodiment can prevent resonance from occurring in the low frequency band (a frequency band smaller than about 200 Hz) in which vibration of the battery pack is likely to occur, and can improve the vibration resistance characteristics. Since the resonance point can be increased and the vibration resistance characteristics can be improved, it is possible to prevent resonance from occurring during use of the battery pack and damage to the internal structure of the battery pack due to resonance. It can be considered that the vibration resistance characteristics could be improved because the thickness of the foam 261 having high rigidity could be made larger than the thickness of the foam 361, and the area of the highly thermally conductive member 262 having low rigidity could be made smaller than that of the highly thermally conductive member 362.

Next, evaluation results of weight reduction characteristics will be described. The specific gravity of a rubber member having thermal conductivity (a thermally conductive rubber member), a hard thermally conductive member, and a soft thermally conductive member that are generally used are as shown in Table 1 below. Note that, physical property values of the thermally conductive rubber member and the hard thermally conductive member were estimated from the specific gravity of a general thermally conductive member.

TABLE 1

| Material | Specific gravity [—] |
|---|---|
| Thermally conductive rubber member | 1.0-3.5 |
| Hard thermally conductive member | 1.0-3.0 |
| Soft thermally conductive member | 1.5-3.5 |
| Material of foam | 0.05-0.3 |

The volume of the spacer member was set to 20,000 $mm^3$, and the mass of the spacer member of Patent Document 1: Japanese Patent Application Laid-Open No. 2019-125449 (also referred to as Document 1), Patent Document 2: Japanese Patent Application Laid-Open No. 2015-76442 (also referred to as Document 2), and the present embodiment described above was determined using the specific gravity in Table 1. The mass of the spacer member corresponding to Document 1 was determined as being composed of one material of a thermally conductive rubber member, and the mass of the spacer member corresponding to Document 2 was determined as having a configuration in which a hard thermally conductive member and a soft thermally conductive member were laminated in the thickness direction. Further, as in Document 2 and the present embodiment, for the spacer member composed of two materials, the ratio of the volumes composed of the respective materials was set to 1:1. The determined mass (the range of mass considered from the range of specific gravity) is shown in Table 2.

TABLE 2

| Configuration of spacer member | Mass of spacer member [g] |
|---|---|
| Document 1 (rubber member with thermally conductive member) | 20-70 |
| Document 2 (hard thermally conductive member/soft thermally conductive member) | 25-65 |
| Present application (soft thermally conductive member/foam) | 15.5-38 |

From Table 2, it can be found that the spacer member according to the present embodiment has a mass ratio of 50 to 80% as compared with the spacer member corresponding to Document 1 or Document 2, and the weight reduction characteristics are improved. Since the weight of the spacer member can be reduced, the weight of the entire battery pack can be reduced.

As described above, in the battery pack according to the present embodiment, there is no configuration that blocks heat transfer, and the heat of the battery can be effectively transferred to the exterior case through the highly thermally conductive member, and, the resonance point can be increased by forming the highly thermally conductive member surrounded by the foam, furthermore, the weight of the spacer member can be reduced by forming a configuration in which the foam surrounds the highly thermally conductive member, instead of a laminated structure of the highly thermally conductive member and the foam, therefore, the heat dissipation characteristics, vibration resistance characteristics, and weight reduction characteristics of the battery pack can be simultaneously improved.

Next, a second embodiment will be described. Note that, in the description of the second embodiment, the same or similar configurations in the above description are denoted by the same reference numerals, and redundant description is appropriately omitted. Further, the matters described in the first embodiment can be applied to the second embodiment unless otherwise specified.

The second embodiment is an embodiment in which the ranges of the volume ratio of the highly thermally conductive member 262 to the spacer member 26 (the volume proportion occupied by the highly thermally conductive member 262 in the entire volume of the spacer member 26) and the volume ratio of the highly thermally conductive member 272 to the spacer member 27 are optimized. Note that, in the following description, the highly thermally conductive member 262 will be described as an example, but the matters described below can also be applied to the highly thermally conductive member 272 unless otherwise specified.

Figure 14:
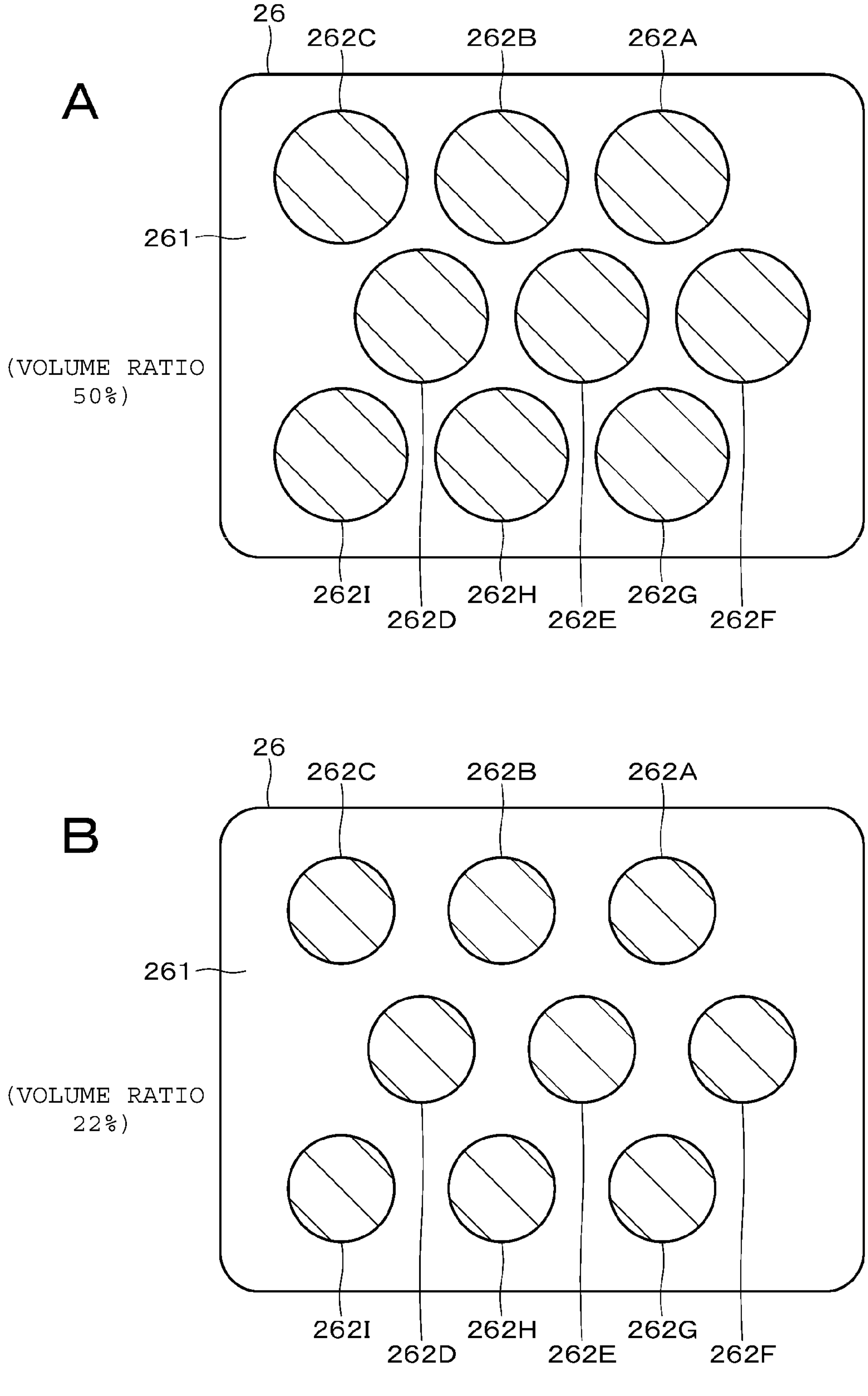
FIG. 14 includes views A and B, where view A is a diagram illustrating an example of a spacer member according to an embodiment, and where view B is a diagram illustrating another example of the spacer member according to an embodiment.

FIG. 14A illustrates the spacer member 26 in which the volume ratio of the highly thermally conductive member 262 is 50%. Further, FIG. 14B illustrates the spacer member 26 in which the volume ratio of the highly thermally conductive member 262 is 22%.

The volume ratio of the highly thermally conductive member 262 to the spacer member 26 is preferably 22% or more and 50% or less as shown in FIGS. 14A and 14B from a viewpoint of improving various characteristics of the battery pack. Hereinafter, the reason will be specifically described.

First, heat dissipation characteristics will be considered. The horizontal axis of the graph shown in FIG. 15 indicates a volume ratio (%), which is the proportion of the volume of the highly thermally conductive member 262 to the entire spacer member 26. Further, the vertical axis of the graph shown in FIG. 15 indicates a maximum temperature ratio (%) of the battery (the cell). For example, the cell maximum temperature ratio was determined and plotted by performing the simulation of the heat dissipation characteristic described in the first embodiment while changing the volume ratio of the highly thermally conductive member 262 by a predetermined % (for example, 1%). The cell maximum temperature ratio was an average of the cell maximum temperature ratios of the nine batteries.

The cell maximum temperature ratio in a case where the volume ratio of the highly thermally conductive member 262 was 0%, that is, all the spacer members 26 are composed of the foam 261, was set to 100%. Further, a simulation result of the cell maximum temperature ratio in a case where all the spacer members 26 are composed of the highly thermally conductive member 262 (volume ratio 100%) was about 78%. Assuming that there is a first-order correlation relationship between the result when the volume ratio of the highly thermally conductive member 262 is 0% and the result when the volume ratio is 100%, this relationship (a first-order straight line) is indicated by a prediction line LNC. The prediction line LNC can also be considered as an example in which the nine highly thermally conductive members 262 are equally disposed regardless of the position of the battery 21. Further, as a result of plotting the cell maximum temperature ratio determined by the simulation, a curved line LND was obtained.

Figure 15:
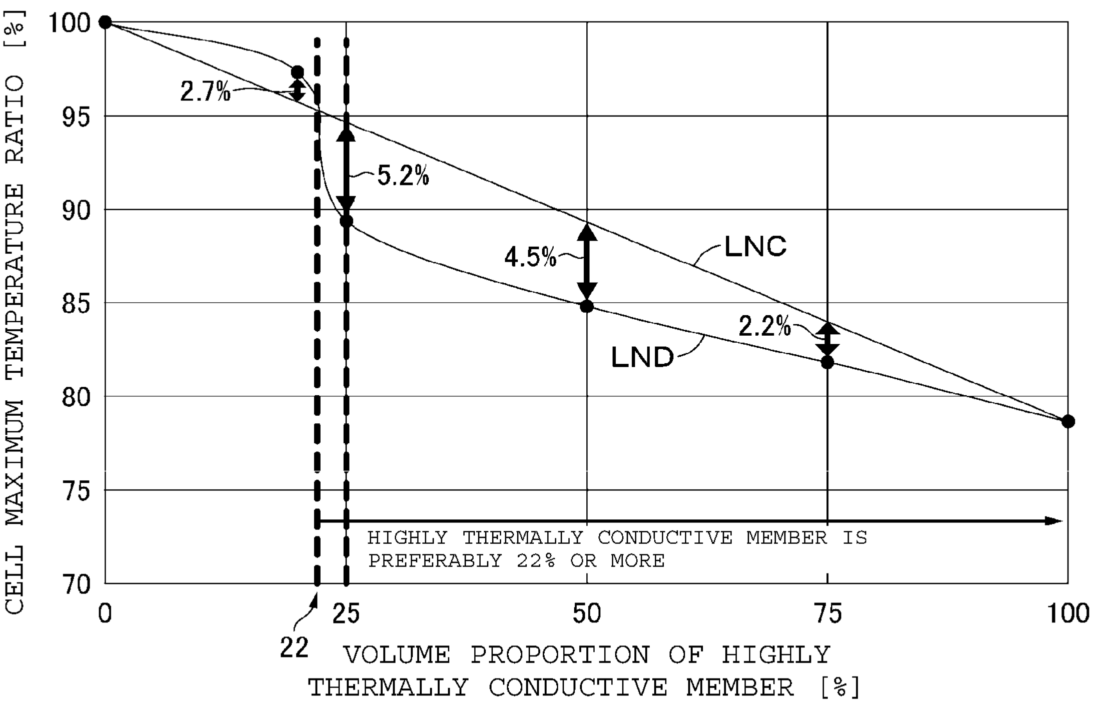
FIG. 15 is a diagram illustrating evaluation results of heat dissipation characteristics.

As shown in FIG. 15, in a case where the volume ratio of the highly thermally conductive member 262 was less than 22%, the cell maximum temperature ratio of the line LND was higher than the cell maximum temperature ratio indicated by the prediction line LNC. In a case where the volume ratio of the highly thermally conductive member 262 was 22% or more, the cell maximum temperature ratio of the line LND was lower than the cell maximum temperature ratio indicated by the prediction line LNC. Therefore, by making the highly thermally conductive member 262 face the terminal 23 of the battery 21, in a case where the proportion of the highly thermally conductive member 262 is as low as 22%, the cell maximum temperature ratio can be reduced as compared with the case where the highly thermally conductive member 262 is equally disposed. In other words, from a viewpoint of effectively suppressing heat generation of the battery 21, it can be said that the volume ratio of the highly thermally conductive member 262 is preferably 22% or more. Note that, as the volume ratio of the highly thermally conductive member 262 approaches 100%, there is no substantial difference in arrangement positions of the nine highly thermally conductive members 262, so that the difference between the value of the prediction line LNC and the value of the line LND gradually decreases and finally converges to substantially the same value.

Figure 16:
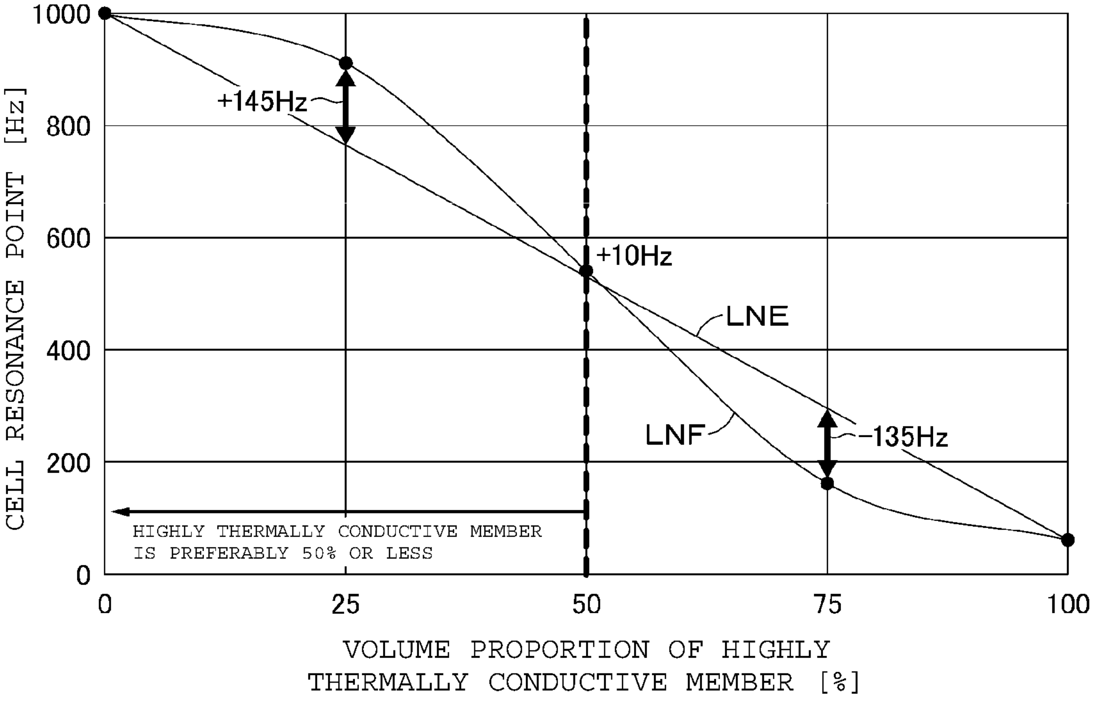
FIG. 16 is a diagram illustrating evaluation results of vibration resistance characteristics.

Next, vibration resistance characteristics will be considered. The horizontal axis of the graph shown in FIG. 16 indicates the volume ratio (%), which is the proportion of the volume of the highly thermally conductive member 262 to the entire spacer member 26. Further, the vertical axis of the graph shown in FIG. 16 indicates a resonance point (Hz) of the battery 21. For example, the resonance point of the battery 21 was determined by performing the simulation of the vibration resistance characteristic described in the first embodiment while changing the volume ratio of the highly thermally conductive member 262 by 1%.

The simulation result in a case where the volume ratio of the highly thermally conductive member 262 was 0%, that is, all the spacer member 26 are composed of the foam 261, was about 1000 Hz. Further, the simulation result in a case where all the spacer member 26 are composed of the highly thermally conductive member 262 was about 50 Hz. Assuming that there is a first-order correlation relationship between the result when the volume ratio of the highly thermally conductive member 262 is 0% and the result when the volume ratio is 100%, this relationship (the first-order straight line) is indicated by the prediction line LNE. Further, as a result of plotting determined by the simulation, a curved line LNF was obtained.

The higher the ratio of the foam 261 that is hard is, the higher a rigidity value increases, so that the resonance point can be brought into the high frequency band. Further, from the simulation results, when the volume ratio of the highly thermally conductive member 262 is 50% or less, the resonance point can be made larger than the prediction line LNE, which is a prediction line. On the contrary, when the volume ratio of the highly thermally conductive member 262 was greater than 50%, the resonance point was smaller than the prediction line LNE, which is the prediction line. This is because when the volume ratio of the highly thermally conductive member 262 is 50% or less, the diameter of the battery 21 is larger than that of the highly thermally conductive member 262, but when the volume ratio of the highly thermally conductive member 262 is greater than 50%, the diameter of the highly thermally conductive member 262 is larger than that of the battery 21. In other words, when the volume ratio of the highly thermally conductive member 262 is greater than 50%, the diameter of the highly thermally conductive member 262 is larger than the diameter of the battery (here, the cell), and thus the entire terminal surface (the terminal surface PRA or PRB) of the battery comes into contact with the highly thermally conductive member 262 that is a soft layer through the tab (the tab 24 or 25). In other words, since it comes into contact with only the highly thermally conductive member 262, which is a layer with a low Young's modulus, the resonance point becomes smaller, and the vibration resistance characteristics in the low frequency band deteriorates. On the contrary, in a case where the volume ratio of the highly thermally conductive member 262 is 50% or less, the diameter of the battery is larger than the diameter of the thermally conductive member. In other words, both the foam 261 and the highly thermally conductive member 262 are disposed at a position overlapping a portion where the terminal surface is projected onto the spacer member, and the terminal surface of the battery is in contact with both the foam 261 and the highly thermally conductive member 262 through the tab. Since the foam 261 has a higher Young's modulus than that of the highly thermally conductive member 262 and is excellent in vibration resistance characteristics in the low frequency band, not only the highly thermally conductive member 262 but also the foam 261 is in contact with the terminal surface of the battery, so that the resonance point increases and the vibration resistance characteristics in the low frequency band are improved. Therefore, from a viewpoint of vibration resistance characteristics for the purpose of preventing resonance of the internal structure, the volume ratio of the highly thermally conductive member 262 is preferably 50% or less.

Next, weight reduction characteristics will be considered. Table 3 shows the mass of the spacer member 26 according to the volume ratio of the highly thermally conductive member 262. As in the first embodiment, the volume of the spacer member 26 was set to 20,000 $mm^3$, and the specific gravity shown in Table 1 of the first embodiment was used as the specific gravity.

TABLE 3

| Configuration of spacer member | Mass of spacer member [g] |
|---|---|
| Highly thermally conductive member 50% (foam 50%) | 16-38 |
| Highly thermally conductive member 25% (foam 75%) | 9-22 |

From the results shown in Table 3, by reducing the volume ratio of the highly thermally conductive member 262 that is soft and has a high specific gravity to 25%, the mass of the spacer member 26 could be reduced by about 40% as compared with the case of the volume ratio of 50%.

From the above, it has been found that the volume ratio of the highly thermally conductive member 262 in the spacer member 26 is preferably 22% or more and 50% or less in order to improve the heat dissipation characteristics, vibration resistance characteristics, and weight reduction characteristics of the battery pack in a well-balanced manner. Further, it has been found that the volume ratio of the highly thermally conductive member 272 in the spacer member 27 is preferably 22% or more and 50% or less.

Further, the vibration resistance characteristics could be improved by a configuration in which both the foam 261 and the highly thermally conductive member 262 were disposed at a position overlapping the portion where the terminal surface was projected on the spacer member 26. In such a configuration, the heat of the battery can be efficiently transferred to the exterior case 10 by the highly thermally conductive member 262, and further, by reducing the volume ratio of the highly thermally conductive member 262 that is soft and has a high specific gravity, not only the vibration resistance characteristic but also the heat dissipation characteristic and weight reduction characteristic can be simultaneously improved.

Modification Example

Although the embodiments of the present application have been specifically described herein, the contents of the present application are not limited thereto the embodiments described above, and thus is suitably modifiable.

In a case where the spacer member has a rectangular shape and the highly thermally conductive member is provided relatively close to the center, heat transferred from a part of the spacer member near a corner to the exterior case can be reduced. Therefore, a highly thermally conductive member may be disposed on at least a part of a peripheral edge portion (a portion including a part near the periphery) of the spacer member. Then, the highly thermally conductive member disposed on the peripheral edge portion of the spacer member and at least a part of the highly thermally conductive member disposed to face a terminal portion of the battery may be connected to each other.

Figure 17:
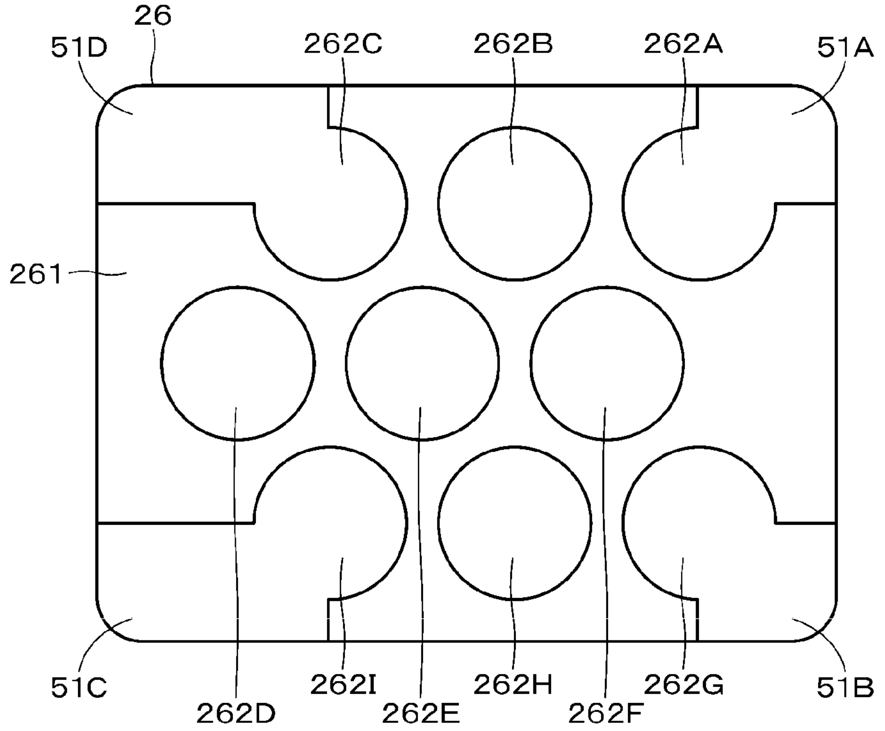
FIG. 17 includes views A and B which are diagrams for describing a modification example.
Figure 17:
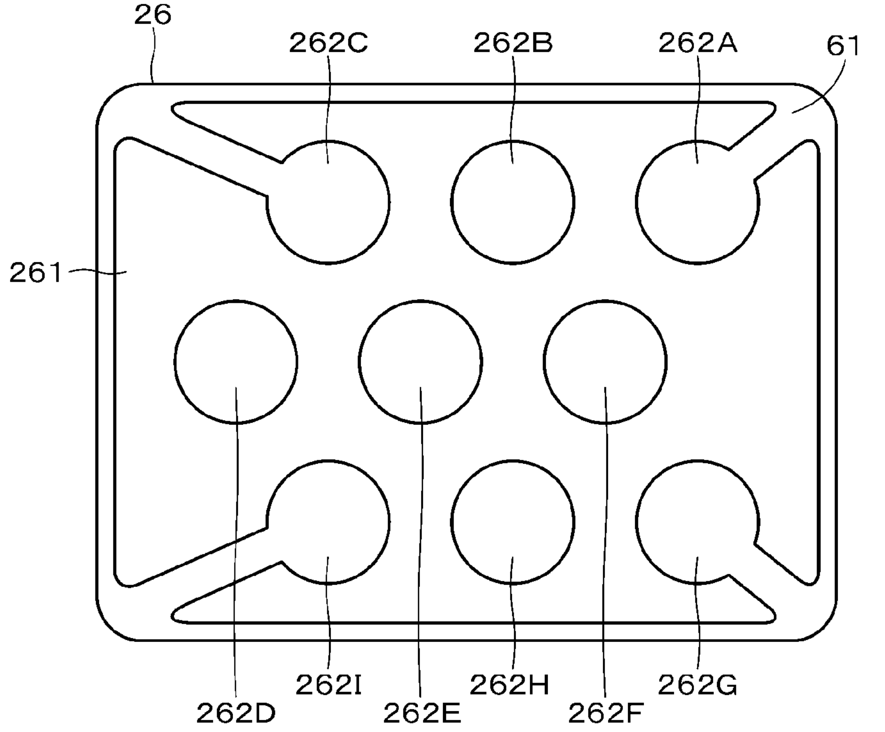

For example, as shown in FIG. 17A, highly thermally conductive members 51A, 51B, 51C, and 51D are provided near four corners of the spacer member 26. As the highly thermally conductive members 51A to 51D, the same members as the highly thermally conductive member 262 can be applied. For example, the highly thermally conductive member 262A and the highly thermally conductive member 51A are connected to each other, the highly thermally conductive member 262G and the highly thermally conductive member 51B are connected to each other, the highly thermally conductive member 262I and the highly thermally conductive member 51C are connected to each other, and the highly thermally conductive member 262C and the highly thermally conductive member 51D are connected to each other. Note that, the sizes and shapes of the highly thermally conductive members 51A, 51B, 51C, and 51D may be shapes and sizes other than those in the illustrated examples, or members different from the highly thermally conductive member 262 may be used.

Further, as shown in FIG. 17B, the spacer member 26 may be provided with a peripheral edge portion 61. Then, the peripheral edge portion 61 near the four corners and the highly thermally conductive member 262 disposed near the corners are connected. For example, the peripheral edge portion 61 near an upper right corner and the highly thermally conductive member 262A located near the corner are connected through the same highly thermally conductive member.

Note that, all of the highly thermally conductive members 262A to 262I may be connected to a highly thermally conductive member provided near a corner or the entire periphery edge. However, as described in the second embodiment, the volume ratio of the highly thermally conductive member is preferably in an appropriate range.

The arrangement position of the spacer member described above is not limited to the arrangement position described in the above-described embodiments. For example, the spacer member, specifically, the foam and the highly thermally conductive member forming the spacer member may be disposed to be in contact with the inner surface of the side surface of the exterior case. Then, the highly thermally conductive member may be in contact with at least a part of the side surface (a body portion forming a peripheral surface) of the battery. Also with such a configuration, heat generated from the battery can be released to the side surface of the exterior case.

In a case where the tab is small in the embodiments described above, there may be an aspect in which the entire tab is in contact with the highly thermally conductive member. Further, there may be no tab, and in this case, the terminal of the battery and the highly thermally conductive member can be in direct contact with each other.

In the embodiments described above, the battery pack has two spacer members, but may have one spacer member, or the battery pack may have three or more spacer members.

In the embodiments described above, the shape of the highly thermally conductive member is substantially circular so as to correspond to the shape of the terminal of the battery, but the present application is not limited thereto. The shape of the highly thermally conductive member may be a rectangular shape, a triangular shape, or the like. Further, in the embodiments, an example in which the foam and the highly thermally conductive member are integrally molded has been described, but the foam and the highly thermally conductive member may be formed in different processes and then integrated by adhesion or the like.

The matters described in the above-described embodiments and modification example can be appropriately combined. Further, the materials, processes, and the like described in the embodiments are merely examples, and the contents of the present application are not limited to the exemplified materials and the like.

The battery pack according to the present application can be mounted on an electric tool, an electric vehicle, various electronic devices, or the like, or can be used for supplying electric power.

Figure 18:
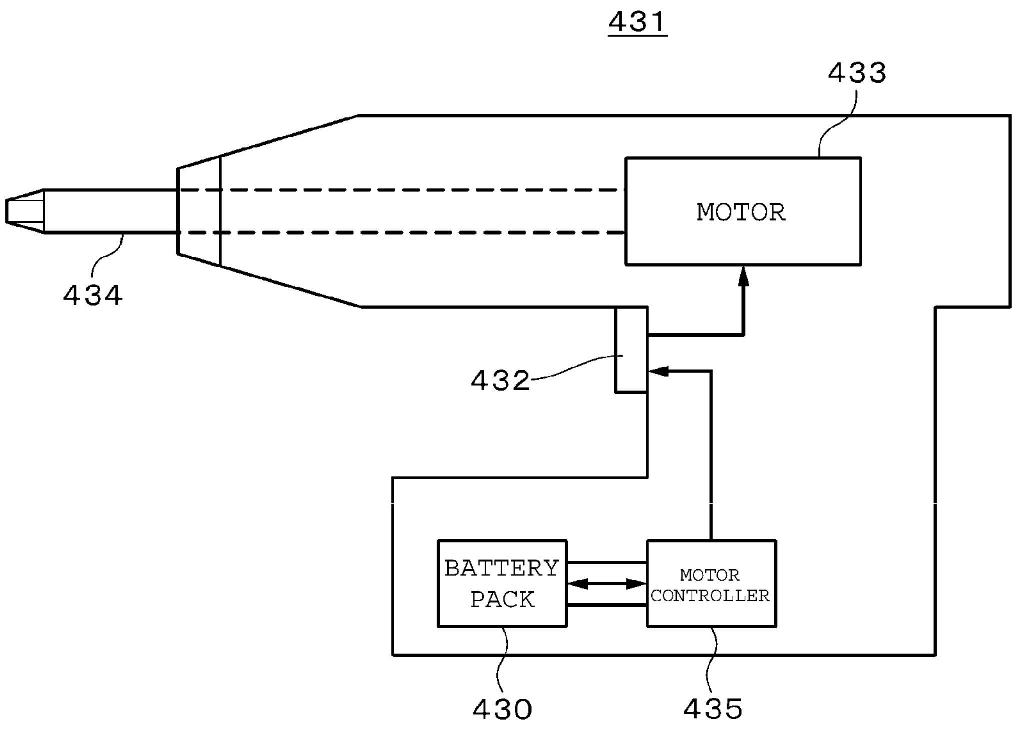
FIG. 18 is a diagram for describing an application example.

An example of an electric driver as an electric tool to which the present technology can be applied will be schematically described with reference to FIG. 18. An electric driver 431 is provided with a motor 433 that transmits rotational power to a shaft 434 and a trigger switch 432 operated by a user. A battery pack 430 and a motor controller 435 are housed in a lower housing of a handle of the electric driver 431. The battery pack 430 is built into the electric driver 431 or is detachable. The battery pack according to the present application can be applied to the battery pack 430.

Each of the battery pack 430 and the motor controller 435 may be provided with a microcomputer (not illustrated) so that charge/discharge information of the battery pack 430 can be communicated with each other. The motor controller 435 can control operation of the motor 433 and cut off power supply to the motor 433 when there is an abnormality such as over discharge.

Figure 19:
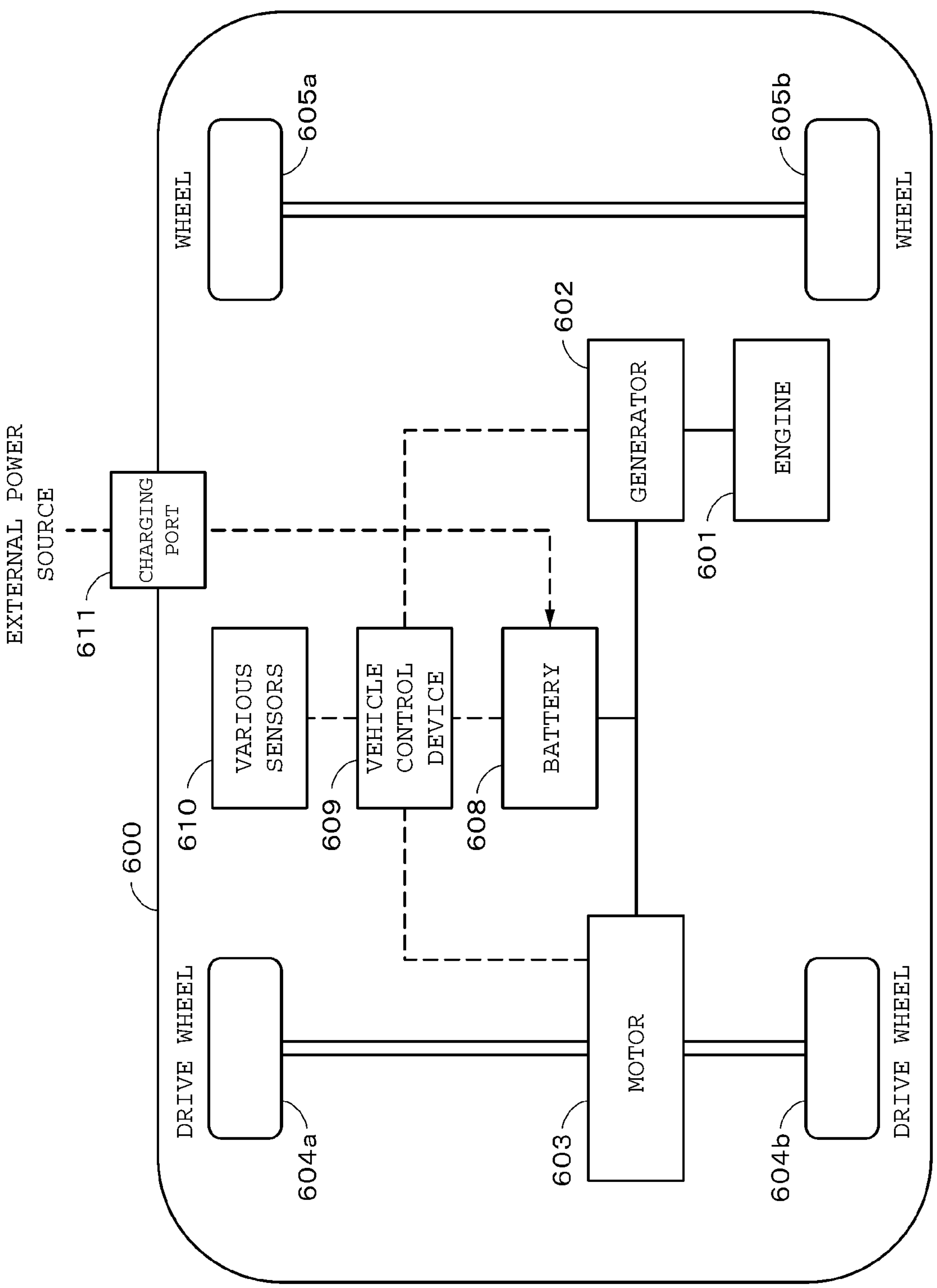
FIG. 19 is a diagram for describing an application example.

As an example in which the present application is applied to a power storage system for an electric vehicle, FIG. 19 schematically illustrates a configuration example of a hybrid vehicle (HV) adopting a series hybrid system. The series hybrid system is a vehicle that runs by an electric power driving force conversion device using electric power generated by a generator powered by an engine or electric power temporarily stored in a battery.

In this hybrid vehicle 600, an engine 601, a generator 602, and an electric power driving force conversion device (a DC motor or an AC motor, hereinafter, simply referred to as "motor 603"), a driving wheel 604*a*, a drive wheel 604*b*, a wheel 605*a*, a wheel 605*b*, a battery 608, a vehicle control device 609, various sensors 610, and a charging port 611 are mounted. As the battery 608, the battery pack according to the present application or a power storage module equipped with a plurality of battery packs according to the present application can be applied.

The motor 603 is operated by the electric power of the battery 608, and a rotational force of the motor 603 is transmitted to the driving wheels 604*a* and 604*b*. The electric power generated by the generator 602 can be stored in the battery 608 by the rotational force generated by the engine 601. The various sensors 610 control an engine speed using the vehicle control device 609 and control an opening degree of a throttle valve (not illustrated).

When the hybrid vehicle 600 is decelerated by a braking mechanism (not illustrated), a resistance force during deceleration is applied to the motor 603 as a rotational force, and regenerative power generated by this rotational force is stored in the battery 608. The battery 608 can be charged by being connected to an external power source through the charging port 611 of the hybrid vehicle 600. Such an HV vehicle is referred to as a plug-in hybrid vehicle (PHV or PHEV).

Note that, a secondary battery according to the present application can also be applied to a miniaturized primary battery and used as a power source of a tire pressure monitoring system (TPMS) built into the wheels 604 and 605.

Although the series hybrid vehicle has been described above as an example, the present application is also applicable to a parallel system using an engine and a motor together or a hybrid vehicle combining a series system and a parallel system. Furthermore, the present application is also applicable to an electric vehicle (EV or BEV) and a fuel cell vehicle (FCV) that runs only by a drive motor without using an engine.

DESCRIPTION OF REFERENCE SYMBOLS

10: Exterior case
21: Battery
23A: Positive electrode terminal
23B: Negative electrode terminal
24, 25: Tab
26, 27: Spacer member
261, 271: Foam
262, 272: Highly thermally conductive member
100: Battery pack It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
an exterior case;
a battery housed in the exterior case and having a terminal;
a conductive member connected to the terminal; and
a spacer member disposed between the battery and the exterior case, wherein
the spacer member is composed of a first insulating member and a second insulating member,
the first insulating member and the second insulating member are in contact with a predetermined inner surface of the exterior case,
the first insulating member is disposed to surround the second insulating member, and
the second insulating member is in contact with at least a part of the battery or at least a part of the conductive member, and
the first insulating member and the second insulating member satisfy the following relationships (1) to (3).

Specific gravity: first insulating member<second insulating member (1)

Young's modulus: first insulating member>second insulating member (2)

Thermal conductivity: first insulating member<second insulating member (3)

2. The battery pack according to claim 1, wherein
the predetermined inner surface is a surface on a side facing the terminal, and
the second insulating member is in contact with at least a part of the conductive member.

3. The battery pack according to claim 1, wherein
the first insulating member is a foam, and
the second insulating member is a flexible member in which a thermally conductive filler is contained in a base material.

4. The battery pack according to claim 3, wherein
the first insulating member is a foam includes one or more of polypropylene, polyethylene, polyphenylene ether, polyester, and polyurethane, and the base material of the second insulating member includes one or more of silicone rubber, acrylic rubber, urethane rubber, styrene-butadiene rubber, and elastomer, and the thermally conductive filler includes one or more of carbon, graphite, alumina, aluminum hydroxide, boron nitride, and ceramic.

5. The battery pack according to claim 1, wherein the second insulating member is disposed in a void provided in the first insulating member, and an outer periphery of the second insulating member is in contact with an inner periphery of the void.

6. The battery pack according to claim 1, wherein the spacer member is disposed to cover upper and lower inner surfaces of the exterior case.

7. The battery pack according to claim 1, wherein the second insulating member is disposed on at least a part of a peripheral edge portion of the spacer member.

8. The battery pack according to claim 1, wherein at least a part of the second insulating member is disposed at a position facing the terminal.

9. The battery pack according to claim 8, wherein the second insulating member is disposed at a position overlapping a portion where a terminal surface on which the terminal is formed is projected onto the spacer member.

10. The battery pack according to claim 8, wherein both the first insulating member and the second insulating member are disposed at a position overlapping a portion where a terminal surface on which the terminal is formed is projected onto the spacer member.

11. The battery pack according to claim 1, wherein a plurality of the batteries are disposed in the battery pack, the first insulating member is disposed at a position corresponding to a space between the batteries.

12. An electric tool comprising the battery pack according to claim 1.

13. An electric vehicle comprising the battery pack according to claim 1.

* * * * *